United States Patent
Arai

(10) Patent No.: US 9,667,836 B2
(45) Date of Patent: May 30, 2017

(54) COLOR CONVERSION PROCESSING APPARATUS AND COLOR CONVERSION PROCESSING METHOD

(71) Applicant: CANON KABUSHIKI KAISHA, Tokyo (JP)

(72) Inventor: Kimitaka Arai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/068,259

(22) Filed: Mar. 11, 2016

(65) Prior Publication Data
US 2016/0277639 A1 Sep. 22, 2016

(30) Foreign Application Priority Data
Mar. 20, 2015 (JP) ................ 2015-057606

(51) Int. Cl.
G06K 15/00 (2006.01)
H04N 1/40 (2006.01)
H04N 1/60 (2006.01)

(52) U.S. Cl.
CPC ......... *H04N 1/6019* (2013.01); *H04N 1/6061* (2013.01); *H04N 1/6094* (2013.01)

(58) Field of Classification Search
CPC .. H04N 1/6019; H04N 1/6061; H04N 1/6094; H04N 1/603; H04N 1/6058; G06K 15/02
USPC .......................... 358/1.1, 1.9, 2.1
See application file for complete search history.

(56) References Cited

U.S. PATENT DOCUMENTS

| | | | |
|---|---|---|---|
| 6,434,266 B1 | 8/2002 | Kanno et al. | 382/162 |
| 7,035,454 B2 | 4/2006 | Kumada et al. | 382/162 |
| 7,116,338 B2 | 10/2006 | Fukao et al. | 345/593 |
| 7,206,094 B2 | 4/2007 | Kumada et al. | 358/1.16 |
| 7,385,739 B2 | 6/2008 | Ohga et al. | 358/518 |
| 7,623,138 B2 | 11/2009 | Fukao et al. | 345/597 |
| 7,701,465 B2 | 4/2010 | Suzuki et al. | 345/601 |
| 7,965,427 B2 | 6/2011 | Suzuki et al. | 358/518 |
| 7,983,479 B2 | 7/2011 | Suzuki et al. | 382/162 |
| 7,990,575 B2 | 8/2011 | Suzuki | 358/1.9 |
| 8,466,993 B2 | 6/2013 | Arai | 348/280 |
| 8,570,517 B2 | 10/2013 | Horita | 356/402 |
| 9,020,249 B2 | 4/2015 | Suzuki et al. | H04N 9/67 |
| 9,083,925 B2 | 7/2015 | Shimada et al. | H04N 1/6097 |

(Continued)

FOREIGN PATENT DOCUMENTS

| | | |
|---|---|---|
| JP | 2011-061723 | 3/2011 |
| JP | 2013-014057 | 1/2013 |

OTHER PUBLICATIONS

U.S. Appl. No. 15/069,669, filed Mar. 14, 2016.

*Primary Examiner* — Douglas Tran
(74) *Attorney, Agent, or Firm* — Fitzpatrick, Cella, Harper & Scinto

(57) ABSTRACT

A color conversion apparatus to output image data to a printer obtains roughness data to indicate the roughness of each pixel in an image expressed by the image data, derives a reduction ratio of a color gamut in each pixel according to a roughness of each pixel in the roughness data, changes color gamut data indicating for the printer on a substantially flat surface according to the derived reduction ratio to derive color gamut data in each pixel, and then performs color conversion on each pixel in the image data using the derived color gamut data.

18 Claims, 20 Drawing Sheets

(56) References Cited

U.S. PATENT DOCUMENTS

| | | | |
|---|---|---|---|
| 2012/0019843 A1* | 1/2012 | Kishimoto | H04N 1/6058 358/1.9 |
| 2013/0307866 A1 | 11/2013 | Arai | G09G 5/02 |
| 2014/0168253 A1 | 6/2014 | Arai et al. | G09G 5/06 |
| 2015/0251447 A1* | 9/2015 | Sayama | B41J 3/4078 347/16 |
| 2015/0254876 A1 | 9/2015 | Arai | G06T 11/001 |

* cited by examiner

R-VALUE STEP : 0, 32, 64, ... , 224, 225

G-VALUE STEP : 0, 32, 64, ... , 224, 225

B-VALUE STEP : 0, 32, 64, ... , 224, 225

Lab VALUE OF GRID(0, 0, 0)
Lab VALUE OF GRID(0, 0, 1)

⋮

Lab VALUE OF GRID(0, 0, 8)
Lab VALUE OF GRID(0, 1, 0)

⋮

Lab VALUE OF GRID(8, 8, 7)
Lab VALUE OF GRID(8, 8, 8)

FIG.5

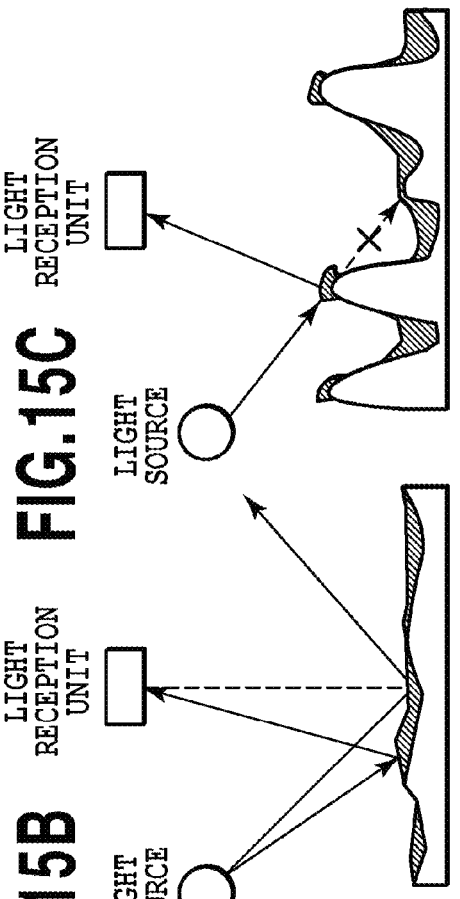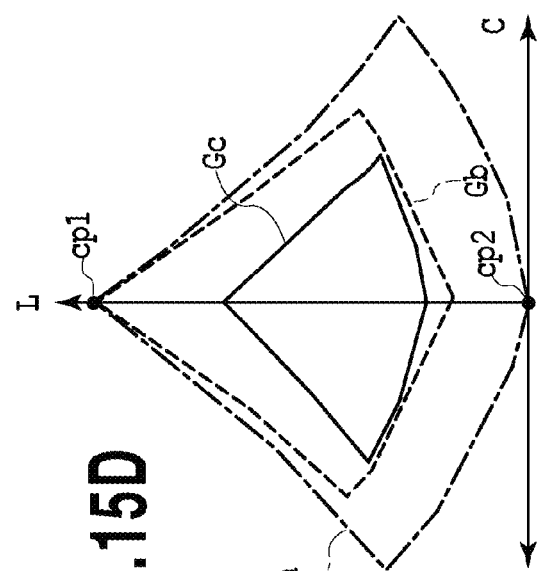

| REGION | AMPLITUDE | COEFFICIENT FOR EACH FREQUENCY | REDUCTION RATIO(s) |
|---|---|---|---|
| Gb' | XXX | XXX | XXX |
| | | ⋮ | ⋮ |
| | | XXX | XXX |
| | XXX | XXX | XXX |
| | | ⋮ | ⋮ |
| | | XXX | XXX |
| | ⋮ | ⋮ | ⋮ |
| Gc' | XXX | XXX | XXX |
| | | ⋮ | ⋮ |
| | | XXX | XXX |
| | XXX | XXX | XXX |
| | | ⋮ | ⋮ |
| | | XXX | XXX |
| | ⋮ | ⋮ | ⋮ |

FIG.18

COLOR CONVERSION PROCESSING APPARATUS AND COLOR CONVERSION PROCESSING METHOD

BACKGROUND OF THE INVENTION

Field of the Invention

The present invention relates to a color conversion technique used in an image processing apparatus.

Description of the Related Art

Recently, the technique of creating a printed matter having an elevation has been widely spread and the demands for color matching thereof have increased. In such a printed matter, it is known that the color gamut enlarges or reduces depending on a print layer stacking method or a roughness (for example, color material density improves and the color gamut enlarges as more print layers are stacked). Here, a user confirms a printed matter which is created based on input color data and determines whether a desired color gamut is obtained or not, and, in the case that the color gamut is not sufficiently wide, the user may obtain the desired color gamut by stacking print layers. In such a case, it is necessary to confirm whether the desired color gamut is obtained or not in the print result, by the measurement of the printed matter or user's visual observation. Further, in the case that the desired color gamut is not obtained, it is necessary to perform the printing again after the change of color parameters and to repeat the above confirmation operation, resulting in an increase of workload.

Japanese Patent Laid-Open No. 2013-14057 proposes a method of presenting a user with a color gamut target for each print layer stacking in the case that the print layer is stacked in a substantially flat surface state for confirming whether a desired color gamut is obtained or not. In Japanese Patent Laid-Open No. 2013-14057, ink amount is determined from input color data for the printing of each print layer by the use of a profile which defines a corresponding relationship between the input color data and the ink amount to be used in each print layer. This profile defines the ink amount so as to enlarge the color gamut every time each print layer is stacked to be printed, and therefore the user can confirm a relationship between the number of print layers and the color gamut easily from the number of stacked print layers without trial and error.

While the technique of enabling the color prediction on a substantially flat surface has been proposed as described above, simple color prediction cannot be performed for a rough surface having a roughness as used in a elevation printing because the roughness is different in each pixel. The technique of Japanese Patent Laid-Open No. 2013-14057 assumes that the print layer is stacked on a substantially flat surface, and therefore cannot present the user with a color gamut target on a rough surface having a roughness. For the confirmation of a print color corresponding to the color gamut change on such a rough surface having a roughness, it could be effective to hold information showing a color gamut for each rough surface having roughness. Then, it could be effective to confirm the print color of a rough surface utilizing input information indicating the rough surface having a roughness and the held information of the color gamut. In the case like this, it is inevitable to hold profiles corresponding to information of all the rough surfaces having roughness and there arises a problem that memory cost is increased and a large amount of printing and measurement for profile generation should be performed.

SUMMARY OF THE INVENTION

A color conversion apparatus according to the present invention is a color conversion apparatus outputting image data on an object to be reproduced to a printing unit, including: a roughness data obtaining unit configured to obtain roughness data indicating a roughness of the object; a reduction ratio deriving unit configured to derive a reduction ratio of a color gamut in each pixel according to a roughness of the pixel in the obtained roughness data; a color gamut deriving unit configured to derive color gamut data to be applied to each pixel by changing color gamut data for the printing unit according to the derived reduction ratio; and a color conversion unit configured to perform color conversion on each pixel in the image data using the derived color gamut data.

Further features of the present invention will become apparent from the following description of exemplary embodiments (with reference to the attached drawings).

BRIEF DESCRIPTION OF THE DRAWINGS

FIG. 5 is a diagram showing an example of a color conversion LUT in Example 1;

FIGS. 15A to 15D are schematic diagrams for explaining color gamut reduction caused by a rough surface having a roughness in Example 2;

FIG. 18 is a schematic diagram showing a relationship between a color gamut reduction ratio and a frequency in Example 2;

DESCRIPTION OF THE EMBODIMENTS

Figures 1A, 1B:
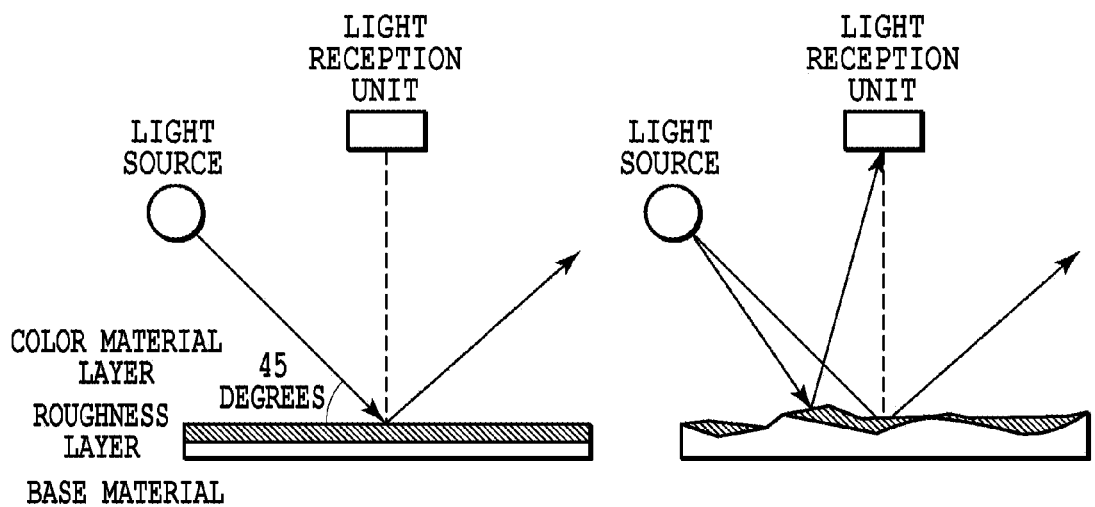
FIGS. 1A to 1C are schematic diagrams for explaining color gamut reduction on a rough surface having a roughness.
Figure 1C:
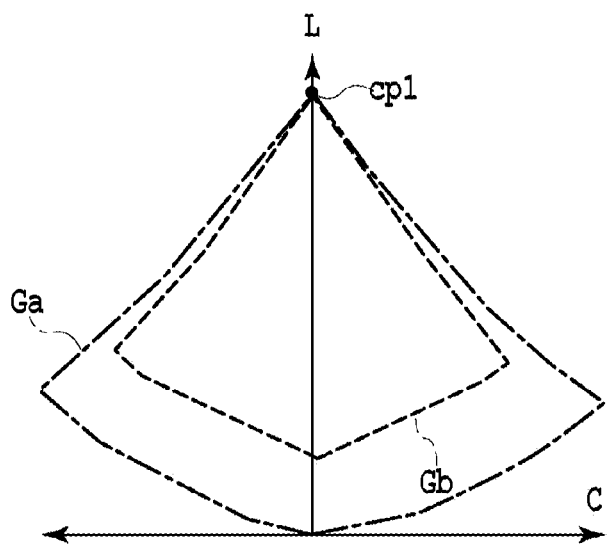

A concept of color gamut reduction on a rough surface having a roughness will be explained in the following by the use of schematic diagrams of FIGS. 1A to 1C. FIGS. 1A and 1B are schematic diagrams showing color measurement geometric conditions which are observed in a cross-sectional direction of a base material. Further, FIG. 1C is a diagram showing color gamut distributions in FIGS. 1A and 1B schematically on the LC plane. Explanation will be provided assuming that a layer having a roughness is formed on a base material and further a color material layer is formed over the layer having a roughness. In FIG. 1A, light emitted from a light source enters having an incident angle of 45 degrees and is reflected on the color material. At this time, mainly a surface diffusion component enters a light reception unit, and a color gamut corresponding to Ga in FIG. 1C is obtained in the layer having a roughness as in FIG. 1A. Next, in FIG. 1B, not only the surface diffusion component but also a specular reflection component from light having an incident angle except 45 degrees enters the light reception unit because of the roughness. In the layer having a roughness as in FIG. 1B, a color gamut is reduced in a low lightness part and a color gamut corresponding to Gb in FIG. 1C is obtained. Here, the above phenomenon is known to occur in the case that the print surface has a non-uniform normal vector distribution. In this case, while the reduction ratio of a color gamut volume depends on a frequency characteristic and a roughness height (amplitude) of the rough surface, sometimes the color gamut is reduced in several percents to several tens of percents with an amplitude of several tens of micrometers.

In embodiments to be explained below, there will be explained an example to enable a user easily to confirm a print color corresponding to a rough surface having a roughness, in the case that the color gamut is reduced in this manner on a layer having a roughness. Further, in the embodiments to be explained below, the memory cost is not increased and also the workload for the profile generation is not increased.

Hereinafter, the present invention will be explained in detail according to preferable examples with reference to the attached drawings. Note that the configuration shown in the following example is only an example and the present invention is not limited to the illustrated configurations.

EXAMPLE 1

<System Configuration Example>

Figure 2:
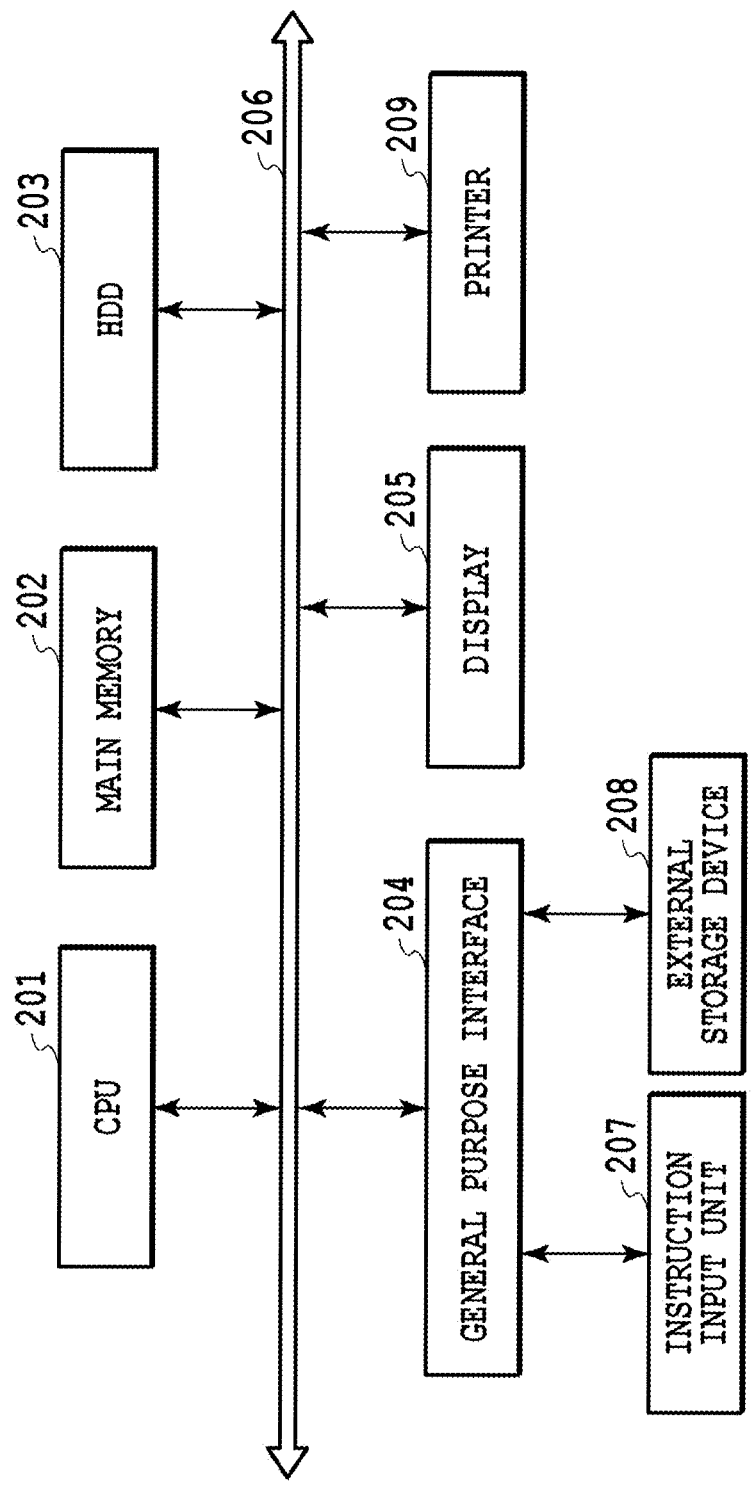
FIG. 2 is a configuration diagram of a color conversion processing apparatus in Example 1.

FIG. 2 is a diagram showing an example of a hardware configuration of a color conversion processing apparatus in the present example. The color conversion processing apparatus is provided with a CPU 201, a main memory 202, an HDD 203, a general purpose interface 204, a display 205, a main bus 206, an instruction input unit 207 such as a keyboard and a mouse, an external storage device 208, and a printer 209. The general purpose interface 204 connects the instruction input unit 207, the external storage device 208, and the like to the main bus 206.

For example, the CPU 201 starts the operation of a color conversion application stored in the HDD 203 or the external storage device 208 in response to a user instruction to the instruction input unit 207. Then, the CPU 201 develops the color conversion application in the main memory 202 and also displays a user interface on the display 205. Subsequently, various kinds of data stored in the HDD 203 or the external storage device 208 are transferred to the main memory 202 via the main bus 206 in response to an instruction from the CPU 201. Predetermined operational processing is performed on the various kinds of data transferred to the main memory 202 in response to an instruction from the CPU 201, and the result of the operational processing is displayed on the display 205 or stored into the HDD 203 or the external storage device 208 via the main bus 206.

<Processing Configuration>

Figure 3:
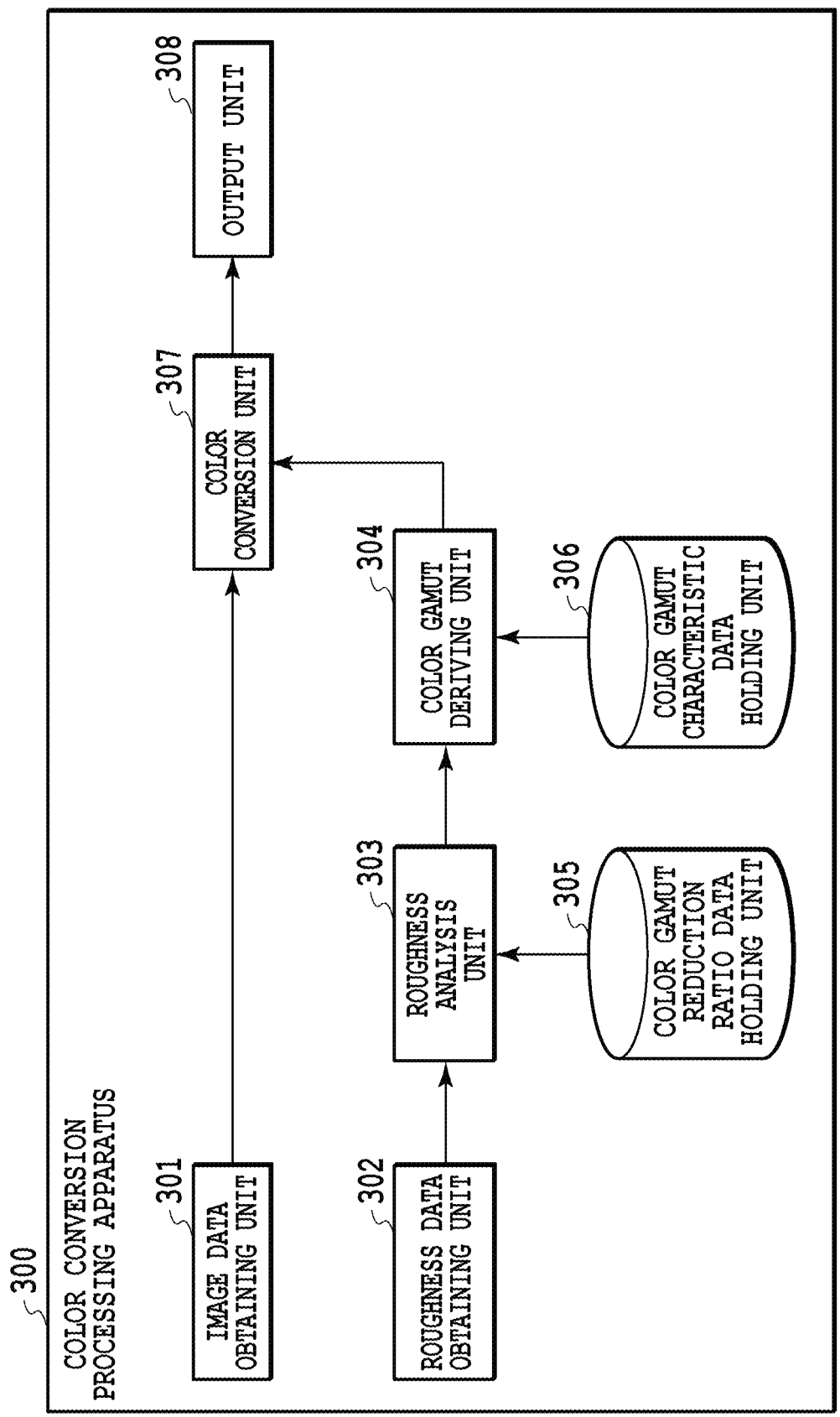
FIG. 3 is a block diagram showing a logical configuration of a color conversion processing apparatus in Example 1.

FIG. 3 is a block diagram showing a functional configuration example of software in the color conversion processing apparatus 300. Here, the configuration shown in FIG. 3 is realized by the CPU 201 executing the color conversion application. In the following, there will be explained various kinds of processing realized by the CPU 201 operating various kinds of software (computer program) stored in the HDD 203.

The color conversion processing apparatus 300 includes an image data obtaining unit 301, a roughness data obtaining unit 302, a roughness analysis unit 303, a color gamut deriving unit 304, a color gamut reduction ratio data holding unit 305, a color gamut characteristic data holding unit 306, a color conversion unit 307, and an output unit 308.

The image data obtaining unit 301 obtains image data input from the HDD 203 or the external storage device 208 via the general purpose interface 204. The obtained image date is image data on an object to be reproduced. The roughness data obtaining unit 302 obtains roughness data corresponding to each pixel of the image data obtained in the image data obtaining unit 301, from the HDD 203 or the external storage device 208 via the general purpose interface 204. That is, the roughness data is data showing the roughness of the object to be reproduced.

The roughness analysis unit 303 analyzes a roughness property from the roughness data obtained in the roughness data obtaining unit 302. Then, the reduction ratio of the color gamut in each pixel is determined from the roughness property obtained as the analysis result and the data held in the color gamut reduction ratio data holding unit. Then, the roughness analysis unit 303 transmits the determined reduction ratio of the gamut in each pixel to the color gamut deriving unit 304. Here, in the present example, a frequency characteristic is assumed to be used as the roughness property. That is, frequency resolution is performed by wavelet transformation in the roughness analysis unit 303, and frequency information extracted as the result is used as the roughness property. Publicly known discrete wavelet transformation can be used as the wavelet transformation. Further, the data held in the color gamut reduction ratio data holding unit 305 is a lookup table (LUT) to associate the roughness property with the reduction ratio, for example.

The color gamut deriving unit 304 calculates the color gamut data of each pixel using the color gamut characteristic data held in the color gamut characteristic data holding unit 306 and the reduction ratio transmitted from the roughness analysis unit 303. The color gamut characteristic data held in the color gamut characteristic data holding unit 306 is data indicating the color gamut of a flat part corresponding to the printer 209, for example.

The color conversion unit 307 performs gamut mapping utilizing the color gamut data corresponding to each pixel calculated by the color gamut deriving unit 304 for each pixel in the image data obtained in the image data obtaining unit 301, and outputs an output result of predicted color data to the output unit 308. The output result outputted to the output unit 308 is displayed on the user interface in the display 205. A user looks at the output result (color conversion result) displayed on the display 205, and can confirm whether an appropriate color conversion is performed or not.

<Color Conversion Processing Operation>

Figure 4:
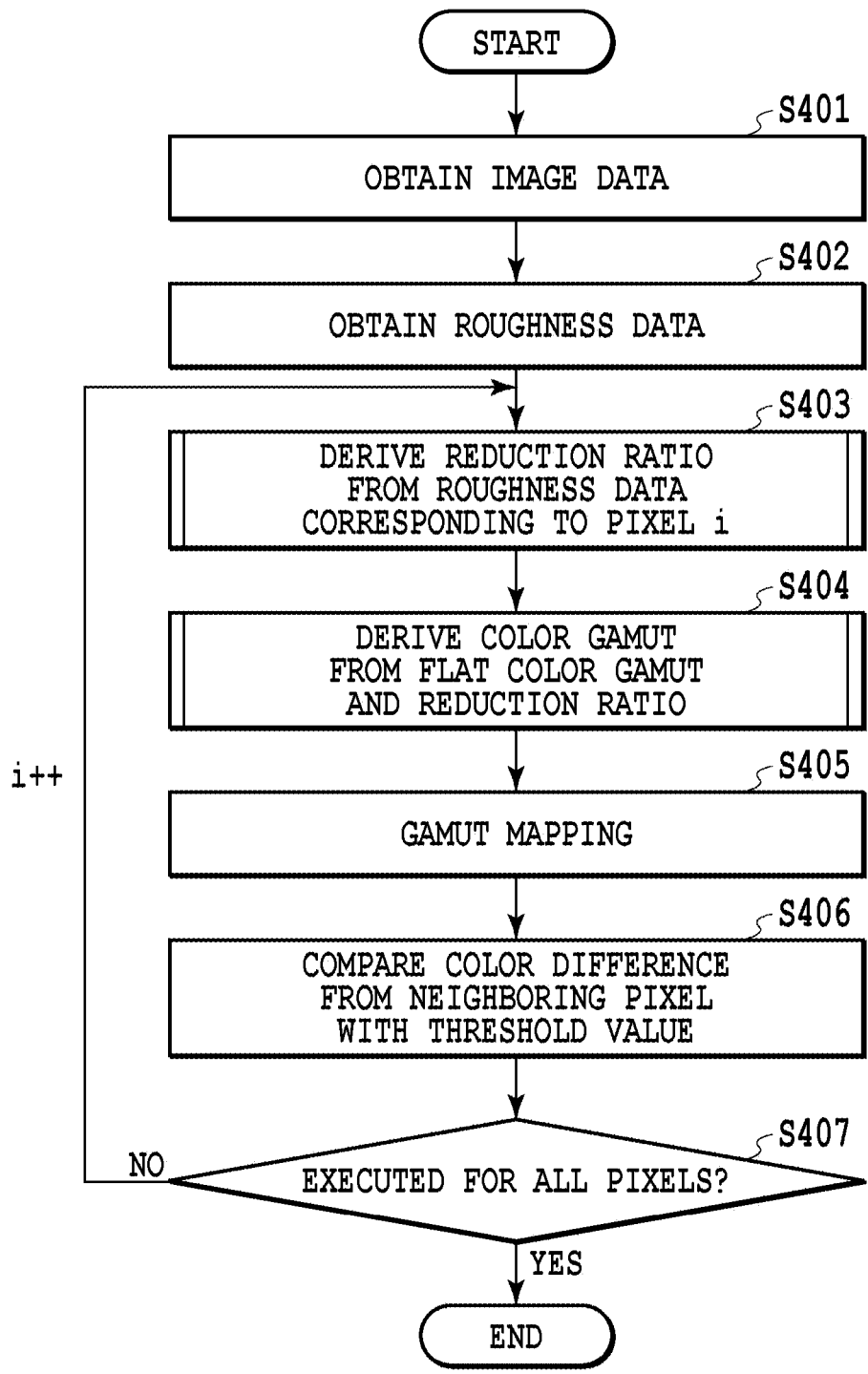
FIG. 4 is a flowchart showing color conversion processing in Example 1.

FIG. 4 is a flowchart of color conversion processing executed in the color conversion application. The processing shown in FIG. 4 is realized by the CPU 201 reading out the color conversion application stored in the HDD 203 to the main memory 202 and executing the color conversion application.

In step S401, the image data obtaining unit 301 obtains the image data input into the color conversion processing apparatus 300.

In step S402, the roughness data obtaining unit 302 obtains the roughness data input into the color conversion processing apparatus 300. This roughness data is data corresponding to the image data obtained in step S401, and data in which a value in each pixel indicates a height from a reference plane, for example.

The processing from step S403 to step S406 is processing performed for each pixel. In step S403, the roughness analysis unit 303 derives a reduction ratio corresponding to the i-th pixel from a result obtained by the analysis of the roughness data obtained in step S402. Details thereof will be described below.

In step S404, the color gamut deriving unit 304 derives color gamut data corresponding to the pixel i from the color gamut characteristic data stored in the color gamut characteristic data holding unit 306 and the reduction ratio derived in step S403. While details will be described below, color gamut data after the change according to the reduction ratio is output as the result of the processing in step S404.

Figure 6:
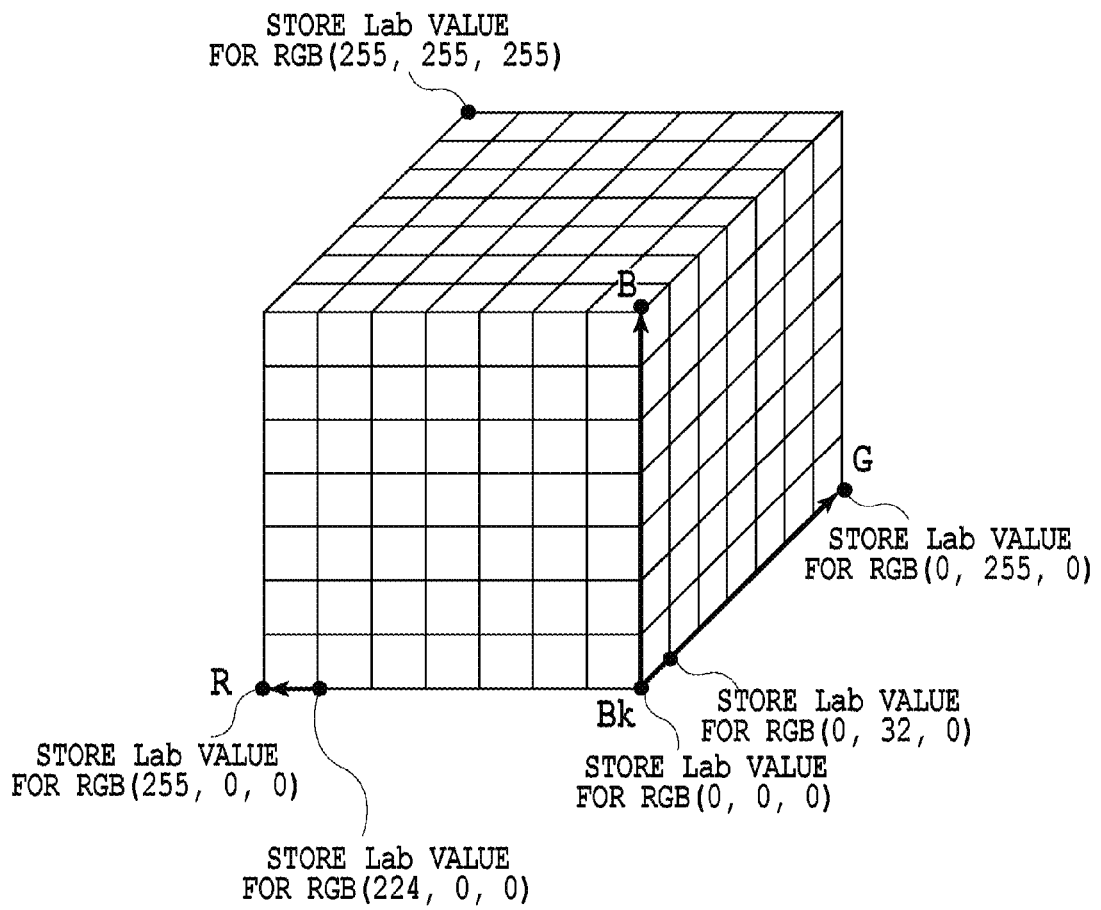
FIG. 6 is a diagram schematically showing RGB coordinates and Lab coordinates in Example 1.
Figure 7:
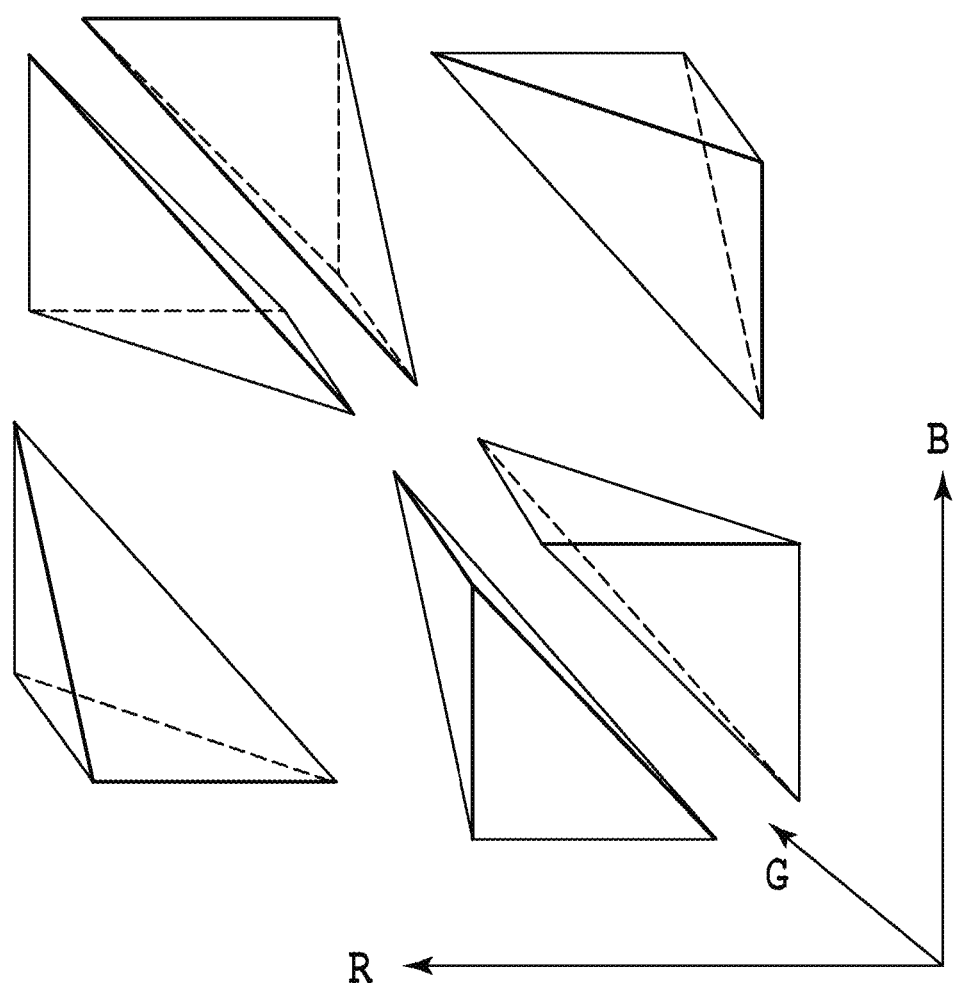
FIG. 7 is a diagram showing an example of tetrahedron interpolation in Example 1.

In step S405, the color conversion unit 307 performs the gamut mapping (color conversion processing) for the pixel i using the color gamut data after the change derived in step S404. Here, the gamut mapping is assumed to be performed in the Lab color space of the CIELAB space, and colorimetric color reproduction is assumed to be used as a mapping method. Each pixel in the input image data is assumed to have RGB values. The pixel values of the i-th pixel in the input image data are assumed to be $R_i$, $G_i$, and $B_i$. The color conversion unit 307 performs the conversion from $R_i$, $G_i$, and $B_i$ to color coordinate values in the Lab color space by tetrahedron interpolation processing using a color conversion LUT, to perform RGB to Lab conversion on the i-th pixel values. The color conversion LUT is a lookup table describing an association between color coordinate values of a grid point in the RGB color space and coordinate values to reproduce the grid point in the Lab color space. FIG. 5 is a diagram showing an example of the data structure of the color conversion LUT. Steps of R, G, and B values are described at the top of the data structure, and, thereunder, Lab color coordinates corresponding to each grid point are nested to be described in the order of R, G, and B. FIG. 6 expresses this data structure schematically in the RGB color space. Further, in the tetrahedron interpolation, interpolation processing is performed for each of six tetrahedron regions which are divided from a hexahedron region surrounded by neighboring eight grid points as schematically shown in FIG. 7. For example, the color conversion unit 307 searches a hexahedron region including the $R_i$, $G_i$, and $B_i$ values of the i-th pixel. Then, the color conversion unit 307 identifies a tetrahedron region including the R, G, and B values among tetrahedron regions divided from the searched hexahedron region as in FIG. 7. Then, the color conversion unit 307 performs the interpolation processing on the Lab values of the apexes in the identified tetrahedron according to the distances between the apex values of the identified tetrahedron and the $R_i$, $G_i$, and $B_i$ values, and thereby derives $L_i$, $a_i$, and $b_i$ values which are Lab-conversion values of the i-th pixel. In the case that the $R_i$, $G_i$, and $B_i$ values are the values just corresponding to the apexes, the $R_i$, $G_i$, and $B_i$ values may be converted into values obtained with reference to the color conversion LUT.

Further, in this step S405, the color conversion unit 307 also performs color conversion processing of the i-th pixel using the color gamut characteristic data which corresponds to the printer 209 and is held in the color gamut characteristic data holding unit 306. That is, in step S405, for the i-th pixel, values after the color conversion processing are obtained by the use of the color gamut data before the change and the color gamut data after the change. Here, while the color conversion processing itself may be performed by the above explained processing in the color conversion unit 307, a different color conversion LUT is used in this case.

Next, in step S406, the color conversion unit 307 determines using Formula 1 whether the ratio of the color difference from the neighboring pixel between before and after the color gamut change is larger than a threshold value or not. That is, it is determined whether or not the ratio between the color difference between the i-th pixel and the (i−1)th pixel before the color gamut change and the color difference between the i-th pixel and the (i−1)th pixel after the color gamut change is larger than the threshold value. In Formula 1, the color conversion result of the i-th pixel before the color gamut change is expressed by $L_i$, $a_i$, and $b_i$, and the color conversion result of the i-th pixel after the color gamut change is expressed by $L_i^1$, $a_i^1$, and $b_i^1$.

$$\frac{\sqrt{((L_i^1 - L_{i-1}^1)^2 + (a_i^1 - a_{i-1}^1)^2 + (b_i^1 - b_{i-1}^1)^2)}}{\sqrt{((L_i - L_{i-1})^2 + (a_i - a_{i-1})^2 + (b_i - b_{i-1})^2)}} > \text{threshold} \quad \text{Formula 1}$$

In the present example, the color conversion processing is performed for each pixel using the color gamut according to the roughness. At this time, there is a possibility that some pixel has a large color difference between before and after the color gamut change depending on the roughness. Accordingly, as will be described below, a portion (pixel) having a large color difference between before and after the color gamut change is exhibited clearly to the users in the user interface displayed on the display 205. Thereby, it is possible to cause the user to recognize a part to be watched in the case that the user confirms the print color. In step S406, as pre-processing of performing the processing like this, the determination processing is performed for each pixel to compare the ratio of the color difference from the neighboring pixel between before and after the color gamut change, with the threshold value.

In step S406, the color conversion unit 307 stores the determination result for each pixel into a variable Pi. It is assumed that the variable P has the same number of pixels as the image data (roughness data), for example, and Pi corresponds to the i-th pixel. For example, the color conversion unit 307 allocates one to Pi for the case that the ratio of the color difference from the neighboring pixel between before and after the color gamut change is larger than the threshold value, and allocates zero to Pi for the ratio smaller than the threshold value. Note that, while the color difference in the Lab color space is used as an example of the threshold value, Euclidean distance in the XYZ color space or Euclidean distance in the RGB color space may be utilized, for example.

Next, the color conversion processing apparatus 300 determines whether or not the processing from step S403 to step S405 has been performed on all the pixels in the image data and the roughness data obtained in step S401 and step S402. In the case that the processing has not been performed on all the pixels, one is added to a variable i which expresses the pixel number and the process jumps to step S403. Otherwise, the output unit 308 outputs the image data after the color conversion and the variable P obtained as the result of step S406, and performs operation for termination.

<User Interface>

Figure 8:
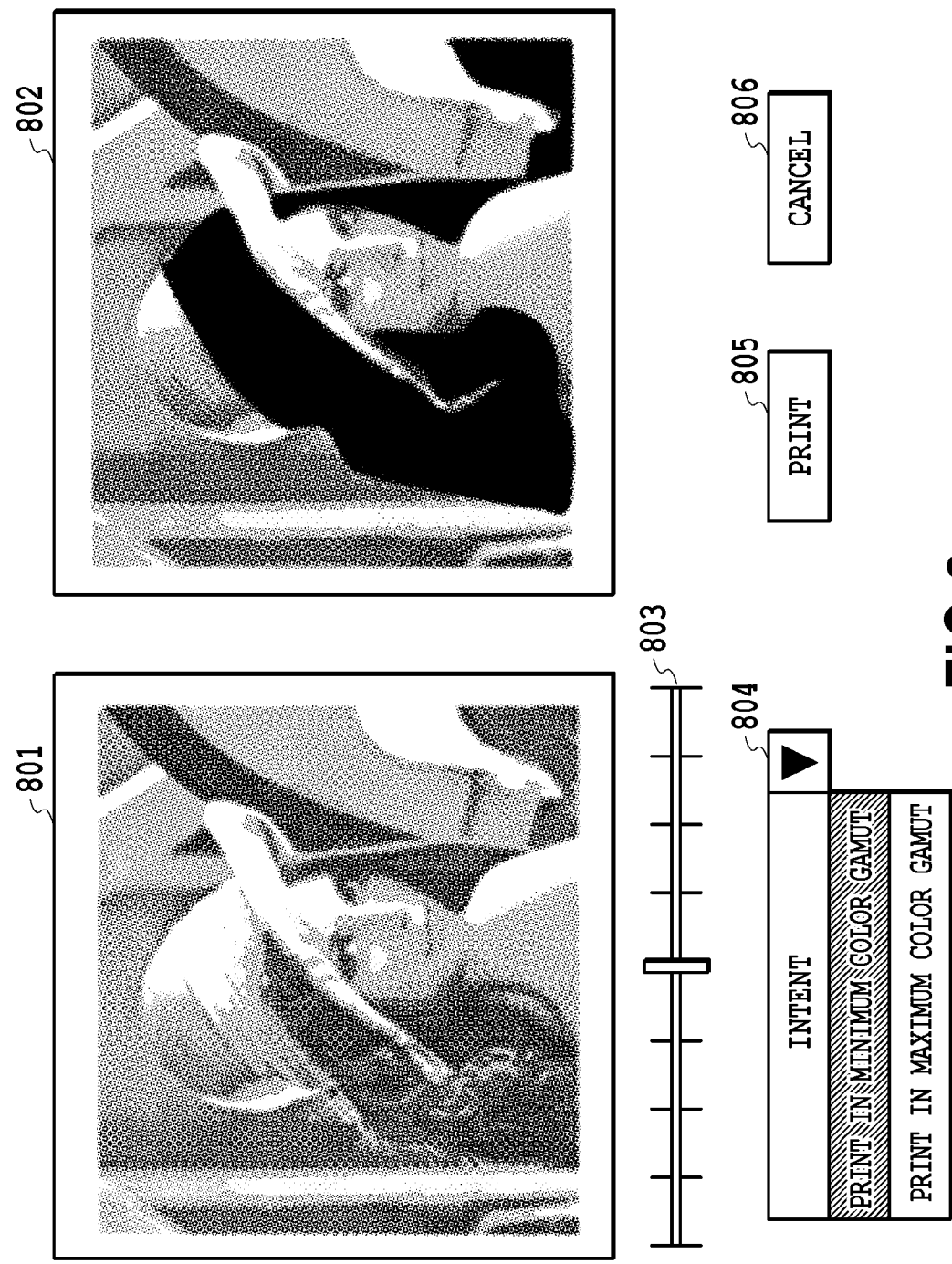
FIG. 8 is a diagram showing an example of a user interface in Example 1.

FIG. 8 is a diagram showing an example of the user interface which displays the execution result of the color conversion application on the display 205. A window 801 displays an image based on the image data obtained as the result of the color conversion. The image obtained as the result of the color conversion is displayed similarly also on a window 802. Here, the image of the window 802 clearly exhibits a pixel where one is allocated to the variable Pi with reference to the variable P obtained as the result of step S406 for each pixel position on the window 802. For example, a region where one is allocated to the variable Pi is painted in black in the window 802 of FIG. 8. This part painted in black is a portion (pixel) where the color difference from the neighboring pixel is different between before and after the color gamut change. Note that the example of FIG. 8 shows an example of displaying, in black, the portion (pixel) where the color difference from the neighboring pixel is different between before and after the color gamut change, the present example is not limited to this case. For example, only one window is prepared and only the portion (pixel) where the color difference from the neighboring pixel is different between before and after the color gamut change may be blinked. Any mode may be used if the portion (pixel) where the color difference from the neighboring pixel is different between before and after the color gamut change can be confirmed by the user. For example, in the case that the threshold value is set as ΔE=1 (level to detect the color difference between the neighboring levels), a tone-jump region where the level exceeds the threshold value is displayed on the user interface. The user can confirm the tone-jump region and select whether to use the maximum color gamut or the minimum color gamut, by operating a combo box 804, depending on whether image failure exists or not.

A slide bar 803 is a slide bar to be used in the case that the user sets the threshold value which is a reference for displaying, in black, the above portion (pixel) where the color difference from the neighboring pixel is different between before and after the color gamut change. The combo box 804 is a combo box for selecting the intent of the color conversion, and selects whether to use the minimum color gamut or the maximum color gamut. A button 805 is a print execution button, and printing is performed according to the selected intent in response to user's press down. A button 806 is a cancel button, and the color conversion application is terminated in response to user's depression.

Here, the "maximum color gamut" and the "minimum color gamut" to be selected in the combo box 804 will be explained. In the present example, the reduction ratio is determined according to the roughness for each pixel, and the color gamut data is derived according to the reduction ratio. Then, the color conversion is performed for each pixel by the use of the derived color gamut data. "Printing in maximum color gamut" means processing of performing printing using a pixel value (color value) after the color conversion which is obtained by the use of the color gamut data derived for each pixel. "Printing in minimum color gamut" means processing of performing printing using a pixel value (color value) which is obtained by the color conversion for each pixel by the use of the color gamut data common among the pixels. The color conversion processing using the color gamut data common among the pixels means, for example, if even one pixel exists corresponding to the minimum color gamut Gb in FIG. 1C, color conversion processing of all the pixels using the color gamut data of the color gamut Gb. The case of using the maximum color gamut is a mode capable of utilizing the reproduction capability of the printer at the maximum so as to output a high chroma color. In the case of using the maximum color gamut, the processing is performed using different color gamut information for each pixel, and therefore there is a possibility that tone characteristic might be broken. On the other side, the case of using the minimum color gamut is a mode of attaching weight to the tone characteristic without utilizing the reproduction capability of the printer so much. In the case of using the minimum color gamut, the high chroma color might not be output although the tone characteristic is not broken. The combo box 804 in FIG. 8 is a user interface to support the user in visual selection which mode to be used in such a trade-off.

Figure 9:
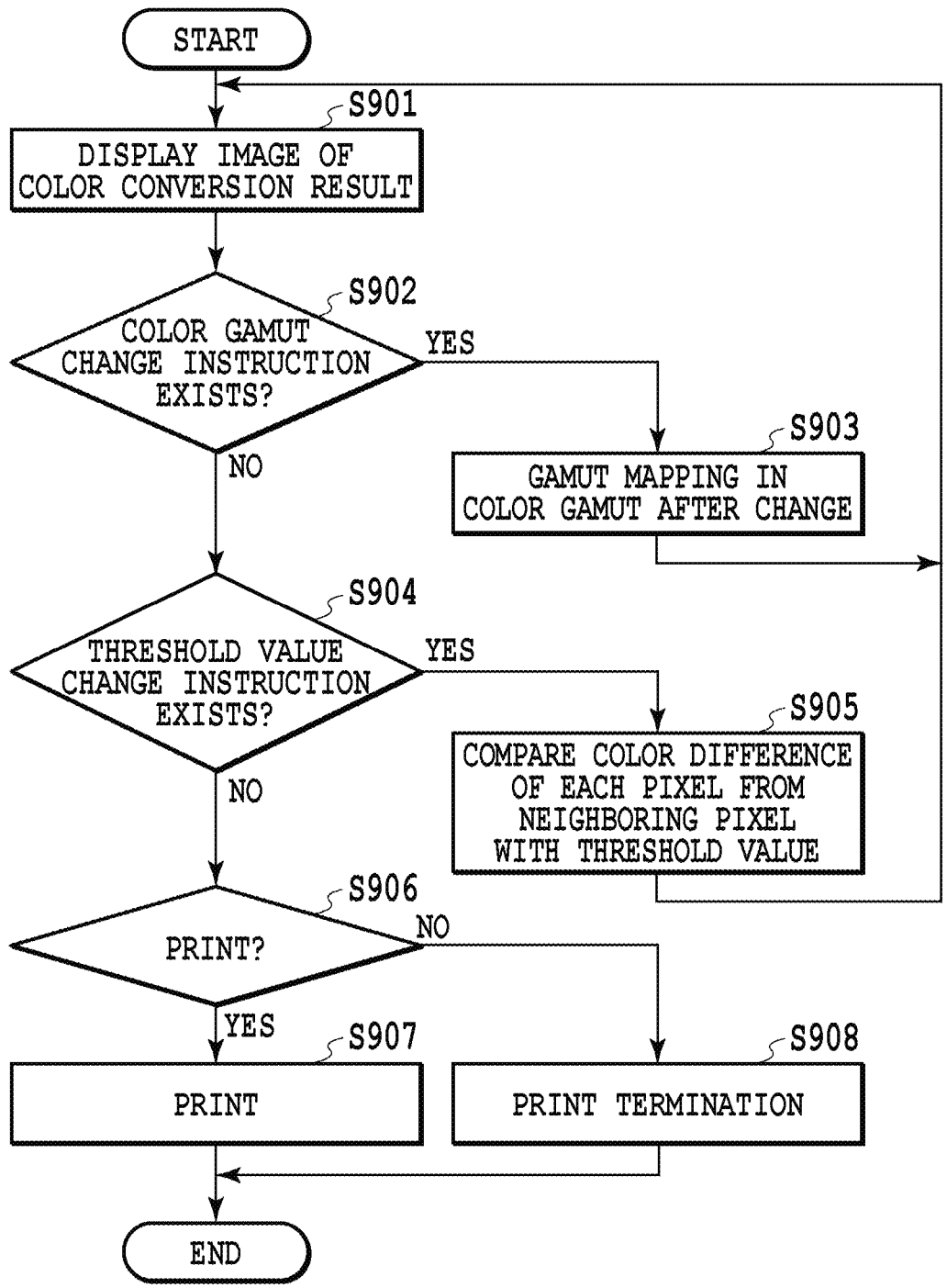
FIG. 9 is a flowchart showing processing according to user interface operation in Example 1.

Next, processing according to the user interface operation shown in FIG. 8 will be explained by the use of FIG. 9. FIG. 9 is a diagram showing an example of the processing of the color conversion processing apparatus 300 after the processing shown in FIG. 4.

In step S901, the color conversion processing apparatus 300 displays an image of the color conversion result on the display 205. The color conversion processing apparatus 300 displays the user interface screen as shown in FIG. 8, for example. Next, in step S902, the color conversion processing apparatus 300 determines whether a color gamut change instruction exists or not. In the present example, the default setting is assumed to be the "printing in maximum color gamut". The user refers to the user interface as shown in FIG. 8 as described above, and performs the instruction of the color gamut change via the combo box 804 in consideration of image failure or the like.

In the case that the color gamut change instruction exists, in step S903, the color conversion processing apparatus 300 performs the gamut mapping in the color gamut after the change. In the case of setting change from the "printing in maximum color gamut" to the "printing in minimum color gamut", for example, the color gamut deriving unit 304 obtains the color gamut data of each pixel obtained according to the reduction ratio, and determines the color gamut data common among all the pixels. Then, the color conversion unit 307 performs the gamut mapping of each pixel using the determined color gamut data common among all the pixels. After that, the process proceeds to step S901.

On the other side, in the case without the color gamut change instruction, in step S904, the color conversion processing apparatus 300 determines whether a threshold value change instruction exists or not. For example, it is determined whether the setting of the slide bar 803 is changed or not. In the case with the threshold value change instruction, in step S905, the color conversion unit 307 compares the changed threshold value and the ratio of the color differences from the neighboring pixel for each pixel between before and after the color gamut change. Step S904 performs processing similar to the processing at step S406 on all the pixels. After that, the process proceeds to step S901.

On the other side, in the case without the threshold value change instruction, in step S906, the color conversion processing apparatus 300 determines whether a printing instruction exists or not. In the case with the printing instruction, the process proceeds to step S907, and the color conversion processing apparatus 300 performs printing using a pixel value (color value) which is color-converted by the use of the set color gamut after the change, and, in the case without the printing instruction, the color conversion processing apparatus 300 discontinues the printing processing in step S908.

<Reduction Ratio Derivation Processing>

Figure 10:
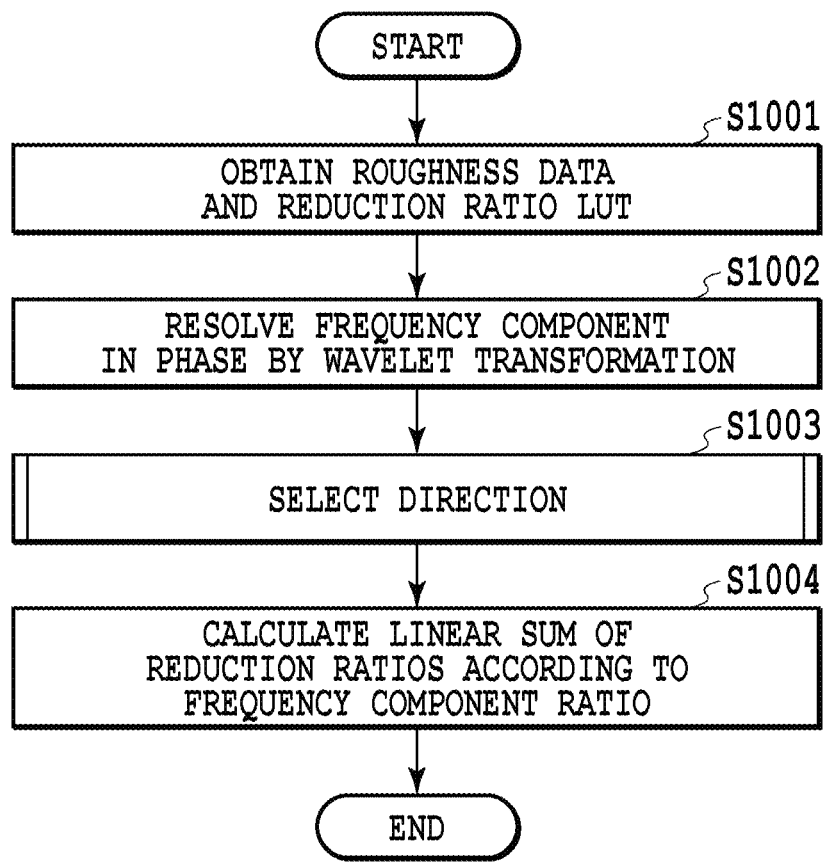
FIG. 10 is a flowchart showing color gamut reduction ratio calculation in Example 1.

Next, the processing executed in step S403 for deriving the color gamut reduction ratio in the pixel i will be explained. FIG. 10 is a flowchart showing an example of the processing in the roughness analysis unit 303.

Figures 11A, 11B:
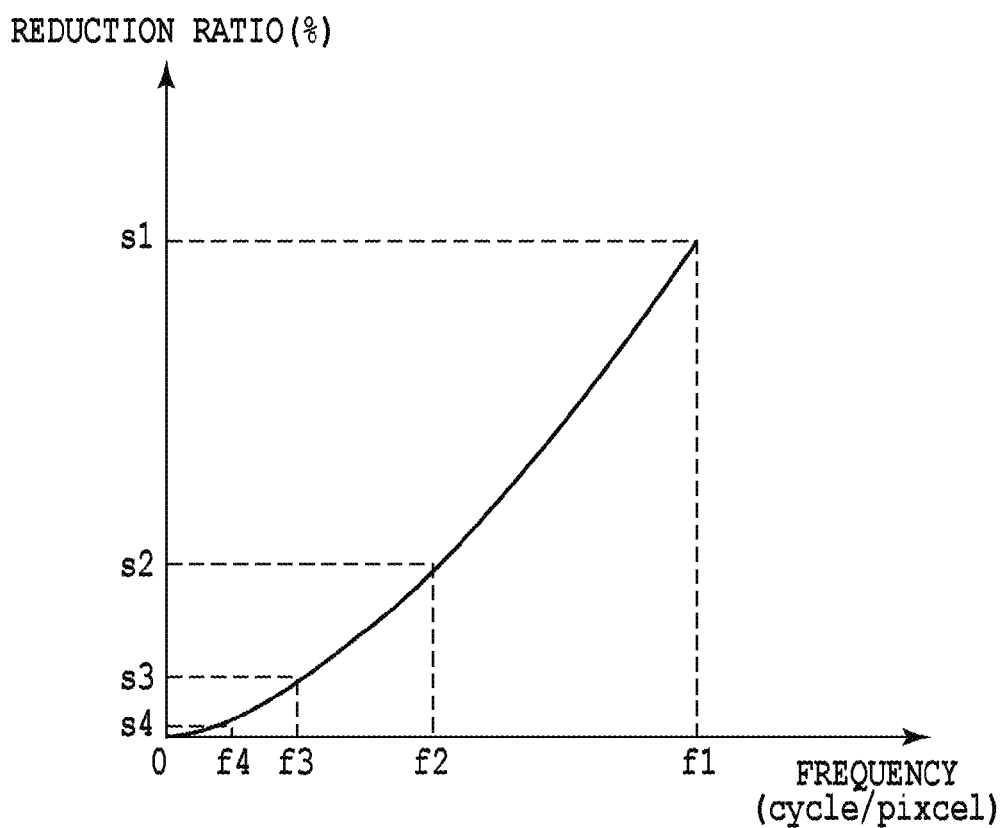
FIGS. 11A and 11B are schematic diagrams showing a relationship between a color gamut reduction ratio and a frequency in Example 1.

In step S1001, the roughness analysis unit 303 obtains the roughness data and the reduction ratio LUT, which is held in the color gamut reduction ratio data holding unit 305, indicating a relationship between the roughness and the color gamut reduction ratio. FIGS. 11A and 11B are schematic diagrams of an example of the reduction ratio LUT held in the color gamut reduction ratio data holding unit 305. The color gamut reduction ratio data holding unit 305 describes a correspondence relationship between the frequency of the roughness data as an example of a roughness feature amount and the reduction ratio as shown in FIG. 11A. Further, FIG. 11B shows an example of a 1DLUT correspondence relationship between the frequency of the roughness data and the reduction ratio. The roughness analysis unit 303 obtains the roughness feature amount (frequency) of the pixel i, refers to the reduction ratio LUT, and derives the color gamut reduction ratio corresponding to the obtained roughness feature amount (frequency).

In step S1002, the roughness analysis unit 303 performs frequency resolution of the roughness data by the wavelet transformation. The roughness data is a kind of image data having concavo-convex height information for each pixel as described above. A publicly known discrete wavelet transformation is used as a frequency resolution method. The roughness data can be converted into a signal of a plurality of frequency bands by the use of the wavelet transformation. Here, the level of the wavelet transformation is level 2 for explanation in the present example. Obviously the level may be level 3 or a higher level. Since the method of the discrete wavelet transformation is a publicly known technique, detailed explanation will be omitted here. In the following, the processing of using the result obtained by the use of the wavelet transformation will be explained.

Figure 12:
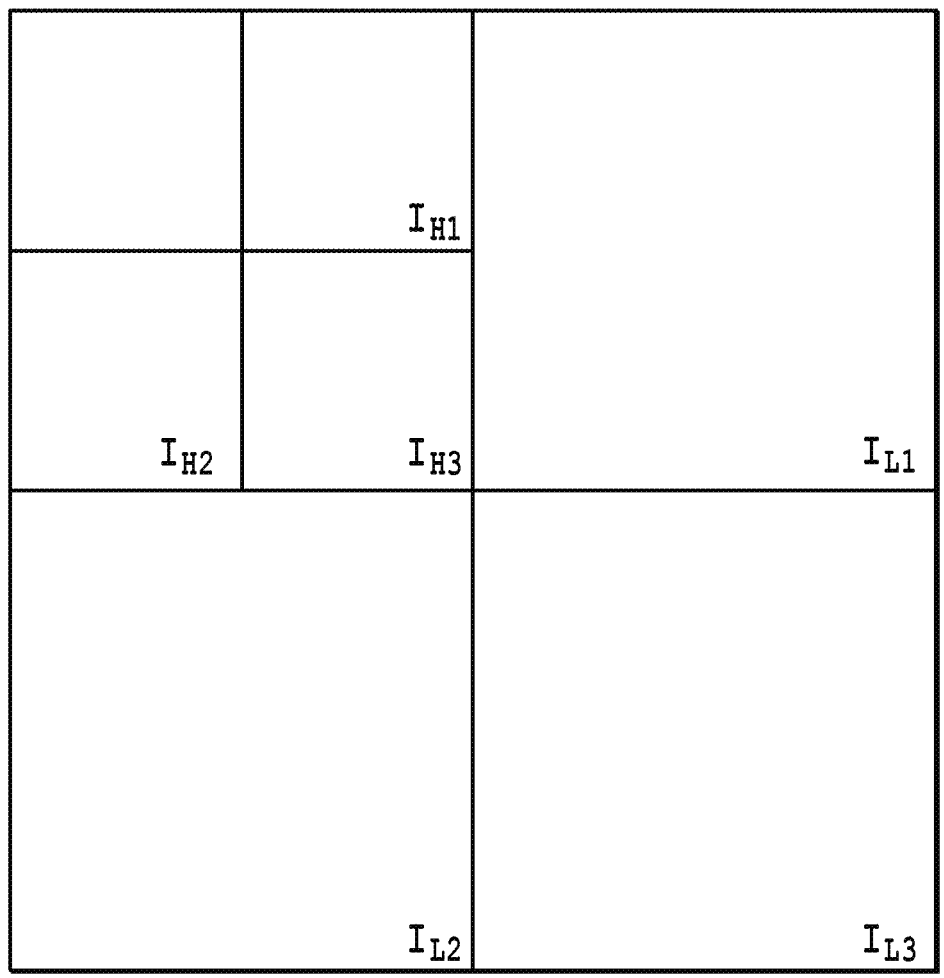
FIG. 12 is a schematic diagram showing a frequency resolution result in wavelet transformation in Example 1.

FIG. 12 is a schematic diagram to express a result of the discrete wavelet transformation. A roughness image I expressed by the roughness data is resolved into a high frequency component $I_H$ and a low frequency component $I_L$, and the respective components are resolved into $I_{H1}$, $I_{H2}$, and $I_{H3}$, and $I_{L1}$, $I_{L2}$, and $I_{L3}$ depending on the directions of a waveform (vertical direction, horizontal direction, and oblique direction). Here, the numbers of vertical pixels and horizontal pixels in the original image I are denoted by M and N, and the relationships between the pixel i (x, y), and $I_{L1}$ ($x_{L1}$, $y_{L1}$), $I_{L2}$ ($x_{L2}$, $y_{L2}$), and $I_{L3}$ ($x_{L3}$, $y_{L3}$) are obtained as shown in following Formula 2. Further, the relationships between the pixel i (x, y) and $I_{H1}$ ($x_{H1}$, $y_{H1}$), $I_{H2}$ ($x_{H2}$, $y_{H2}$), and $I_{H3}$ ($X_{H3}$, $y_{H3}$) are obtained as shown in following Formula 3 and Formula 4. That is, the frequency component in a phase corresponding to the pixel i is obtained from following Formula 2 to Formula 4 using the result of the discrete wavelet transformation.

$$x_{L1} = \begin{cases} \frac{1}{2}(N+x) & \text{if } x\mod 2 = 0 \\ \frac{1}{2}(N+x-1) & \text{if } x\mod 2 = 1 \end{cases} \quad \text{Formula 2}$$

$$y_{L1} = \begin{cases} \frac{y}{2} & \text{if } y\mod 2 = 0 \\ \frac{1}{2}(y-1) & \text{if } y\mod 2 = 1 \end{cases}$$

$$x_{L2} = \begin{cases} \frac{x}{2} & \text{if } x\mod 2 = 0 \\ \frac{1}{2}(x-1) & \text{if } x\mod 2 = 1 \end{cases}$$

$$y_{L2} = \begin{cases} \frac{1}{2}(M+y) & \text{if } y\mod 2 = 0 \\ \frac{1}{2}(M+y-1) & \text{if } y\mod 2 = 1 \end{cases}$$

$$x_{L3} = \begin{cases} \frac{1}{2}(N+x) & \text{if } x\mod 2 = 0 \\ \frac{1}{2}(N+y-1) & \text{if } y\mod 2 = 1 \end{cases}$$

$$y_{L3} = \begin{cases} \frac{1}{2}(M+y) & \text{if } y\mod 2 = 0 \\ \frac{1}{2}(M+y-1) & \text{if } y\mod 2 = 1 \end{cases}$$

$$x_{H1} = \begin{cases} \frac{1}{4}(N+x) & \text{if } x\mod 4 = 0 \\ \frac{1}{4}(N+x-1) & \text{if } x\mod 4 = 1 \\ \frac{1}{4}(N+x-2) & \text{if } x\mod 4 = 2 \\ \frac{1}{4}(N+x-3) & \text{if } x\mod 4 = 3 \end{cases} \quad \text{Formula 3}$$

$$y_{H1} = \begin{cases} \frac{y}{4} & \text{if } y\mod 4 = 0 \\ \frac{1}{4}(y-1) & \text{if } y\mod 4 = 1 \\ \frac{1}{4}(y-2) & \text{if } y\mod 4 = 2 \\ \frac{1}{4}(y-3) & \text{if } y\mod 4 = 3 \end{cases}$$

$$x_{H2} = \begin{cases} \frac{x}{4} & \text{if } x\mod 4 = 0 \\ \frac{1}{4}(x-1) & \text{if } x\mod 4 = 1 \\ \frac{1}{4}(x-2) & \text{if } x\mod 4 = 2 \\ \frac{1}{4}(x-3) & \text{if } x\mod 4 = 3 \end{cases}$$

$$y_{H2} = \begin{cases} \frac{1}{4}(M+y) & \text{if } y\mod 4 = 0 \\ \frac{1}{4}(M+y-1) & \text{if } y\mod 4 = 1 \\ \frac{1}{4}(M+y-2) & \text{if } y\mod 4 = 2 \\ \frac{1}{4}(M+y-3) & \text{if } y\mod 4 = 3 \end{cases}$$

$$x_{H3} = \begin{cases} \frac{1}{4}(N+x) & \text{if } x\bmod 2 = 0 \\ \frac{1}{4}(N+x-1) & \text{if } x\bmod 2 = 1 \\ \frac{1}{4}(N+x-2) & \text{if } x\bmod 2 = 2 \\ \frac{1}{4}(N+x-3) & \text{if } x\bmod 2 = 3 \end{cases} \quad \text{Formula 4}$$

$$y_{H3} = \begin{cases} \frac{1}{4}(M+y) & \text{if } y\bmod 2 = 0 \\ \frac{1}{4}(M+y-1) & \text{if } y\bmod 2 = 1 \\ \frac{1}{4}(N+y-2) & \text{if } y\bmod 2 = 2 \\ \frac{1}{4}(N+y-3) & \text{if } y\bmod 2 = 3 \end{cases}$$

In step S1003, the roughness analysis unit 303 extracts the maximum power direction by a method to be described below. This is because the maximum power direction is considered to provide the largest influence visually.

In step S1004, the roughness analysis unit 303 calculates a linear sum of the reduction ratios according to a frequency component ratio for the resolution result of all the frequencies in the direction extracted in step S1003, and performs the operation for termination. The coefficient of each frequency is denoted by $p_k$, and the reduction ratio linear sums can be expressed as in Formula 5, since the result of the discrete wavelet transformation of level 2 is used.

$$s = \frac{1}{2}\sum_{k=1}^{2} p_k \quad \text{Formula 5}$$

That is, the reduction ratio corresponding to the coefficient of each frequency in the maximum power direction is obtained from the reduction ratio LUT as shown in FIG. 11A, and the linear sum s of the obtained reduction ratio is determined as the reduction ratio of the pixel i.

<Direction Extraction Operation>

Figure 13:
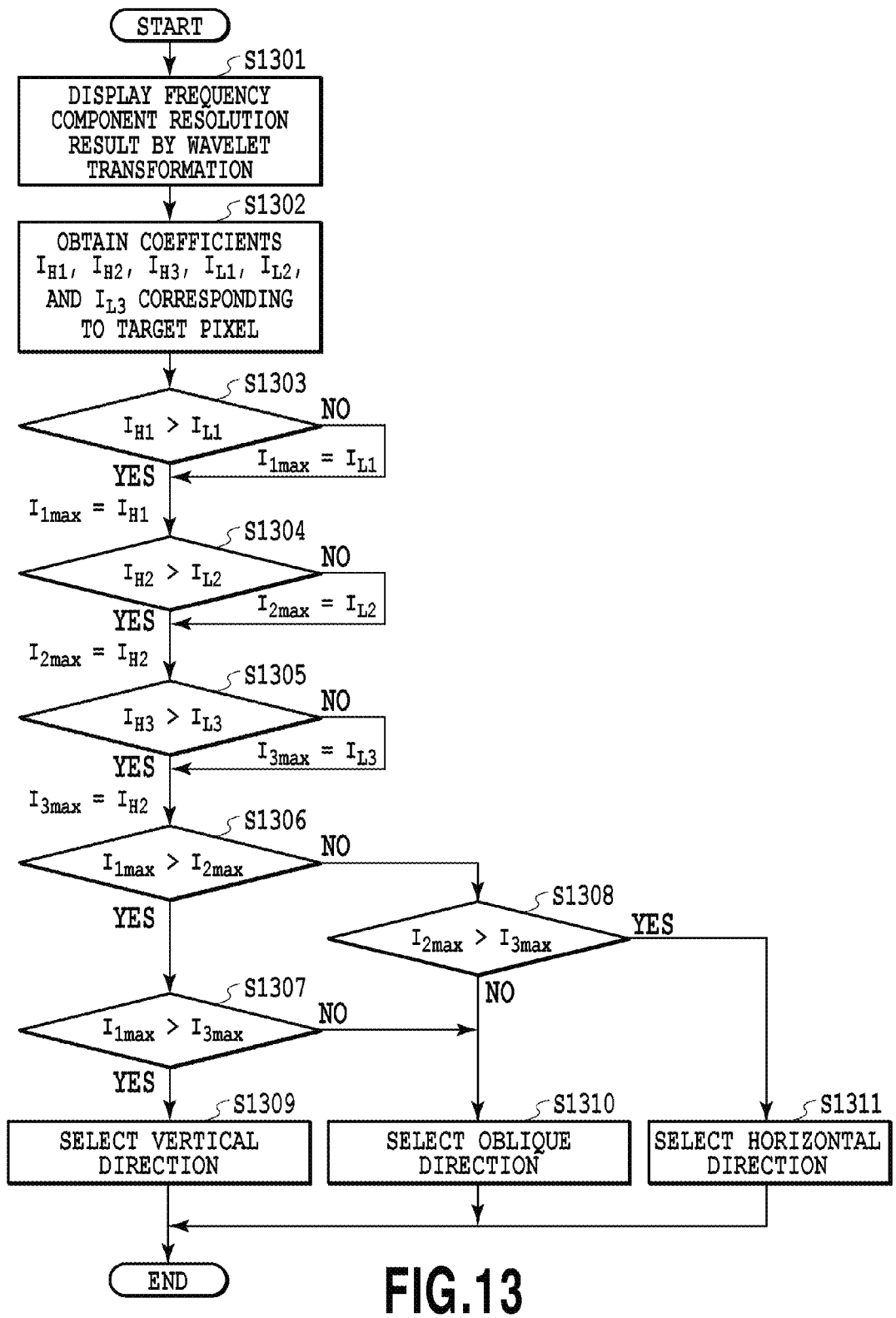
FIG. 13 is a flowchart showing the direction determination of a frequency in Example 1.

FIG. 13 is a flowchart of the processing executed in step S1003 to extract the maximum power direction. In step S1301, the roughness analysis unit 303 obtains the frequency component resolution result in step S1002. In step S1302, the roughness analysis unit 303 obtains the coefficients of the frequency components $I_{H1}$, $I_{H2}$, and $I_{H3}$, and $I_{L1}$, $I_{L2}$, and $I_{L3}$ for the pixel i according to above Formulas 2 to 4.

In step S1303, the roughness analysis unit 303 compares $I_{H1}$ and $I_{L1}$, sets $I_{H1}$ to $I_{1max}$ if $I_{H1}$ is larger, and goes to step S1304, and, otherwise, sets $I_{L1}$ to $I_{1max}$ and goes to step S1304. In step S1304, the roughness analysis unit 303 compares $I_{H2}$ and $I_{L2}$, sets $I_{H2}$ to $I_{2max}$ if $I_{H2}$ is larger, and goes to step S1305, and, otherwise, sets $I_{L2}$ to $I_{2max}$ and goes to step S1305. In step S1305, the roughness analysis unit 303 compares $I_{H3}$ and $I_{L3}$, sets $I_{H3}$ to $I_{3max}$ if $I_{H3}$ is larger, and goes to step S1306, and, otherwise, sets $I_{L3}$ to $I_{3max}$ and goes to step S1306.

In step S1306, the roughness analysis unit 303 compares $I_{1max}$ and $I_{2max}$ and goes to step S1307 if $I_{1max}$ is larger, and, otherwise, goes to step S1308. In step S1307, the roughness analysis unit 303 compares $I_{1max}$ and $I_{3max}$ and goes to step S1309 if $I_{1max}$ is larger, and, otherwise, goes to step S1310.

In step S1308, the roughness analysis unit 303 compares $I_{2max}$ and $I_{3max}$ and goes to step S1311 if $I_{2max}$ is larger, and, otherwise, goes to step S1310.

In step S1309, the roughness analysis unit 303 selects the vertical direction as the maximum power direction of the pixel i, and performs the operation for termination. In step S1310, the roughness analysis unit 303 selects the oblique direction as the maximum power direction of the pixel i, and performs the operation for termination. In step S1311, the roughness analysis unit 303 selects the horizontal direction as the maximum power direction of the pixel i, and performs the operation for termination.

<Color Gamut Derivation Operation>

Figure 14:
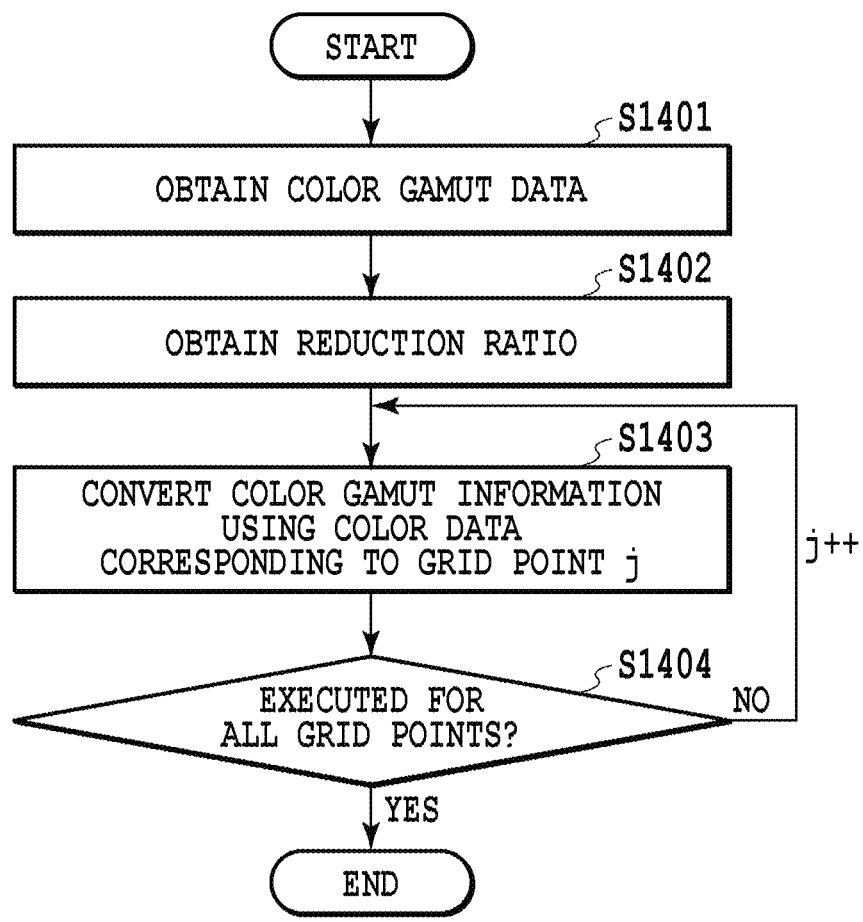
FIG. 14 is a flowchart showing color gamut derivation processing in Example 1.

FIG. 14 is a flowchart of the color gamut derivation processing executed in step S404. In step S1401, the color gamut deriving unit 304 obtains the color gamut data held in the color gamut characteristic data holding unit 306. This color gamut data is data to indicate a color gamut characteristic in the case that printing is performed by the printer 209 on a flat surface, and, for example, a color conversion LUT as described above. In step S1402, the color gamut deriving unit 304 obtains the reduction ratio obtained in step S403.

In step S1403, the color gamut deriving unit 304 converts the color gamut data according to the reduction ratio. Here, if it is assumed that the color value of a grid point j of the color gamut data (color conversion LUT) in a case of printing on the flat surface is denoted by $L_j a_j b_j$, the color value of a reduction convergence point CP1 of FIG. 1C is denoted by $L_{cp1} a_{cp1} b_{cp1}$, and the reduction ratio is denoted by s, the color value $L_j' a_j' b_j'$ of the grid point j after the color gamut change is obtained as in Formula 6. Here the reduction convergence point indicates a point to which the color gamut reduction converges, and indicates a point where chroma is zero and lightness is the same in FIG. 1C.

$$L_j' = L_j + s \times (L_{cp1} - L_j)$$

$$a_j' = a_j + s \times (a_{cp1} - a_j)$$

$$b_j' = b_j + s \times (b_{cp1} - b_j) \quad \text{Formula 6}$$

In step S1404, the color gamut deriving unit 304 determines whether the color gamut change processing using the reduction ratio has been executed or not for all the grid points in the color conversion LUT, performs the operation for termination if the processing has been executed for all the grid points, and, otherwise, changes the processing target grid point j and returns to step S1403.

According to the present example, the color gamut data for the case that the print layer is formed on the flat surface is changed according to the color gamut reduction ratio corresponding to the roughness of each pixel. Then, each pixel is color-converted by using the changed color gamut data corresponding to each pixel, and thereby a print color according to the roughness is calculated. Thereby, the user can confirm the print color easily. In the present example, since the color gamut data corresponding to each roughness is not used directly, it is possible to perform memory cost reduction and efficient profile generation compared with the case of having the color gamut data corresponding to each roughness or the case of holding many profiles.

EXAMPLE 2

In Example 1, as shown in FIG. 1B, an example is explained for the case that the frequency of the roughness data is used as the data expressing the roughness property, the reduction ratio is derived with reference to the LUT expressing the correspondence relationship between the coefficient of each frequency and the reduction ratio, and thereby the color gamut after the change is derived. On the other side, the color gamut reduction due to the roughness is caused not only by the frequency but also by the magnitude of the roughness. In Example 2, there will be explained processing in consideration of the relationship between the color gamut reduction and the magnitude of the roughness having a roughness (in the following, called amplitude) as well as the frequency.

FIG. 15C schematically shows a state that illumination light is blocked by the roughness. FIG. 15C shows an example in which the magnitude of the roughness (i.e., amplitude in frequency component resolution) is larger than that of FIG. 15B. FIG. 15C shows that a part of a specular reflection component of light except light having an incident angle of 45 degrees could reach the light reception unit depending on the roughness. Since, in the roughness of FIG. 15C, the incident light is blocked by the roughness and a part of a surface diffusion component or the specular reflection component does not reach the light reception unit in this manner, lightness reduction is caused as a whole and the color gamut becomes a color gamut corresponding to Gc of FIG. 15D. Here, FIGS. 15A and 15B, and color gamuts Ga and Gb are examples similar to those shown in FIGS. 1A to 1C.

Figure 16:
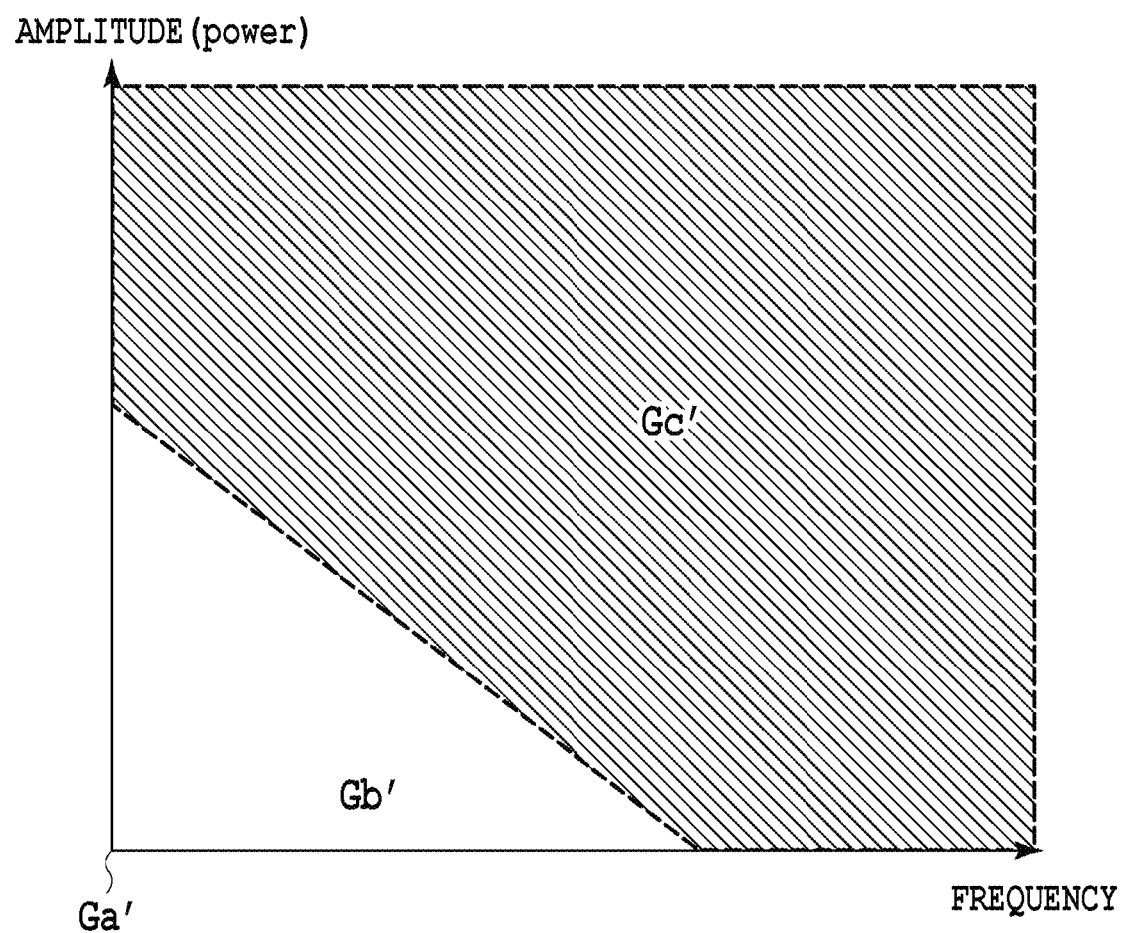
FIG. 16 is a schematic diagram showing a distribution of color gamut characteristic for frequency and amplitude in Example 2.

As described above, it is possible to classify the color gamut reduction caused depending on the roughness according to the combination of the frequency and the amplitude. For example, FIG. 16 schematically shows a distribution pattern of the reduction ratio according to the roughness property (frequency and amplitude) . Ga' of FIG. 16 corresponds to the reduction characteristic according to the roughness property of the substantially flat surface in FIG. 15A. Further, Gb' of FIG. 16 expresses the reduction characteristic (color gamut reduction in a low lightness portion) according to the roughness property of FIG. 15B, and Gc' of FIG. 16 corresponds to the reduction characteristic (decrease in lightness as a whole caused by decrease in light amount) according to the roughness property of FIG. 15C.

In this manner, the tendency of the color gamut reduction is different depending on the relationship between the frequency and the power, in particular, between the roughness properties Gb' and Gc'. Therefore, it becomes difficult to predict the reduction ratio by a simple linear combination in the case that a frequency component corresponding to the roughness property Gb' and a frequency component corresponding to the roughness property Gc' are included in the pixel i, for example.

Accordingly, in Example 2, there will be explained a method of predicting the reduction ratio to derive the color gamut data according to the relationship between the frequency and the amplitude even in the case of including a frequency component having a different tendency of the color gamut reduction. Here, simple explanation will be provided mainly for a difference from Example 1.

<Reduction Ratio Calculation Operation>

Figure 17:
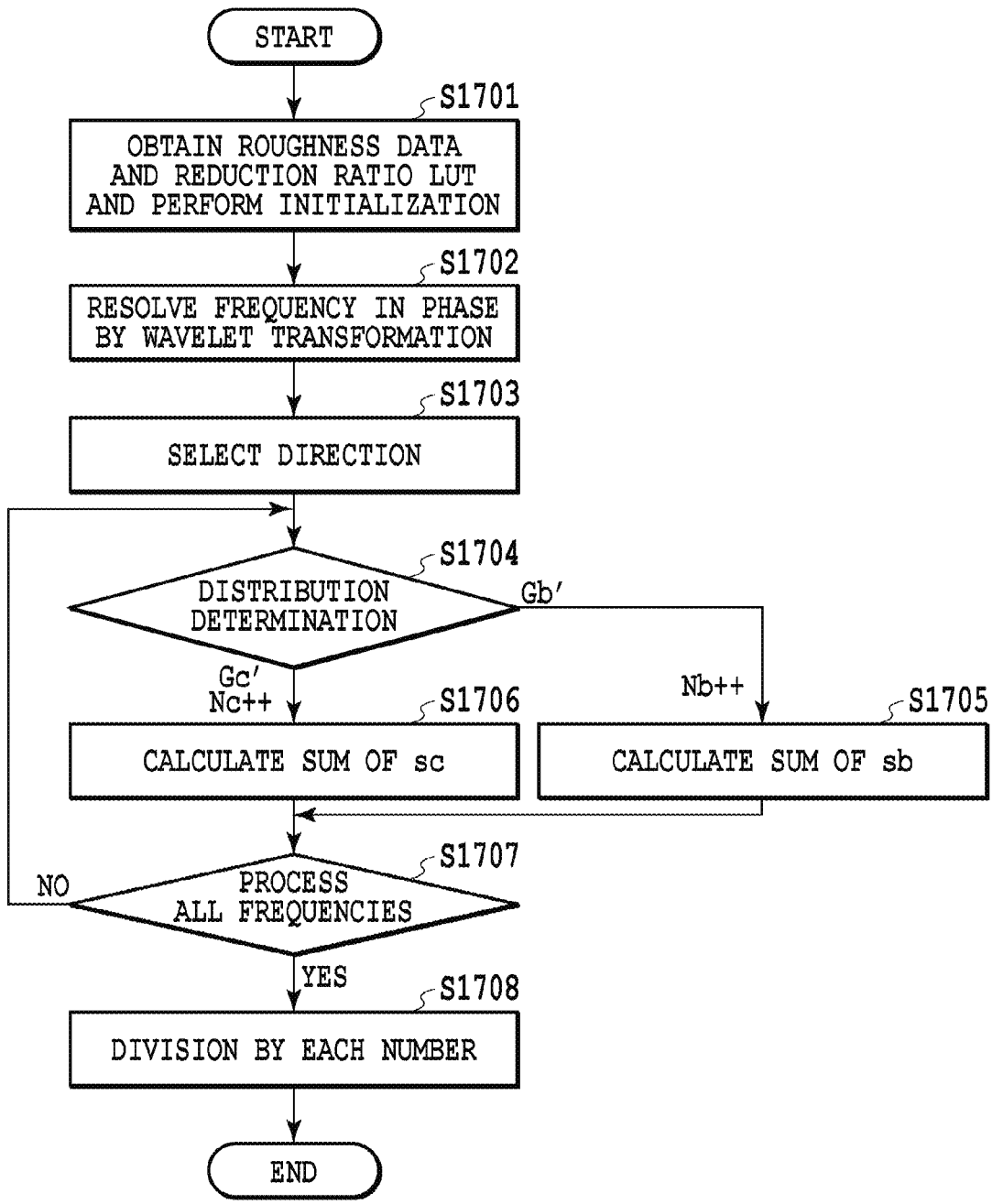
FIG. 17 is a flowchart showing color gamut reduction ratio calculation in Example 2.

FIG. 17 is a flowchart of the processing executed by the roughness analysis unit 303 in step S403 of Example 2 to derive the color gamut reduction ratio in the pixel i.

In step S1701, the roughness analysis unit 303 obtains the roughness data and the reduction ratio LUT to express the reduction ratio corresponding to the correspondence between the frequency and the amplitude. Here, FIG. 18 shows a schematic diagram of the reduction ratio LUT to express the reduction ratio corresponding to the correspondence between the coefficient of each frequency and the amplitude. In the schematic diagram of FIG. 18, the left end column expresses a region, the second left column expresses the amplitude, the third left column expresses the coefficient of each frequency, and the fourth left column expresses the reduction ratio. In this manner, the reduction ratio is described for the combination of the amplitude (power) and the frequency in each region. Further, a variable expressing the reduction ratio corresponding to a region Gb' is denoted by sb, a variable expressing the reduction ratio corresponding to a region Gc' is denoted by sc, and both thereof are initialized to zero.

In step S1702, the roughness analysis unit 303 performs the frequency resolution by the wavelet transformation. Then, in step S1703, the roughness analysis unit 303 extracts the maximum power direction. Steps S1702 and S1703 are the same as steps S1002 and S1003.

In step S1704, the roughness analysis unit 303 determines the distribution of the frequency and the amplitude of FIG. 16 for the k-th frequency component (k=1: low frequency component, and k=2: high frequency component) from the frequency resolution result in the direction extracted instep S1703. That is, it is determined whether the distribution corresponds to the region Gb' or the region Gc' in the distributions of the frequency and the amplitude of FIG. 16. In the case of corresponding to the region Gb', the process proceeds to step S1705, and, in the case of corresponding to the region Gc', the process proceeds to step S1706.

In step S1705, the roughness analysis unit 303 adds one to Nb that expresses a count corresponding to the region Gb' and also calculates the sum of the reduction ratios corresponding to the region Gb'. Specifically, the reduction ratio Sk corresponding to the frequency component selected in step S1703 is calculated by processing to be described below. Then, the reduction ratio Sk corresponding to the selected frequency component is added to the variable sb that expresses the reduction ratio corresponding to the region Gb'. That is, the sum of the reduction ratios is calculated by Formula 7.

$$s_b = s_b + s_k \qquad \text{Formula 7}$$

In step S1706, the roughness analysis unit 303 adds one to Nc that expresses a count corresponding to the region Gc' and also calculates the sum of the reduction ratios corresponding to the region Gc'. Specifically, the reduction ratio Sk corresponding to the frequency component selected in step S1703 is calculated by the processing similar to that in step S1705. Then, the reduction ratio Sk corresponding to the selected frequency component is added to the variable sc that expresses the reduction ratio corresponding to the region Gc'. That is, the sum of the reduction ratios is calculated by Formula 8.

$$s_c = s_c + s_k \qquad \text{Formula 8}$$

In step S1707, the roughness analysis unit 303 determines whether the distribution determination has been performed or not for all the frequency components, and, in the case of having performed the determination for all the frequency components, the process proceeds to step S1708, and, otherwise, the process jumps to step S1704.

In step S1708, the roughness analysis unit 303 calculates the reduction ratios respectively corresponding to the region Gb' and the region Gc' by Formula 9, and performs the operation for termination.

$$s_b = \begin{cases} \frac{1}{N_b} s_b & N_b \neq 0 \\ 0 & N_b = 0 \end{cases} \quad \text{Formula 9}$$

$$s_c = \begin{cases} \frac{1}{N_c} s_c & N_c \neq 0 \\ 0 & N_c = 0 \end{cases}$$

<Color Gamut Calculation Operation>

Figure 19:
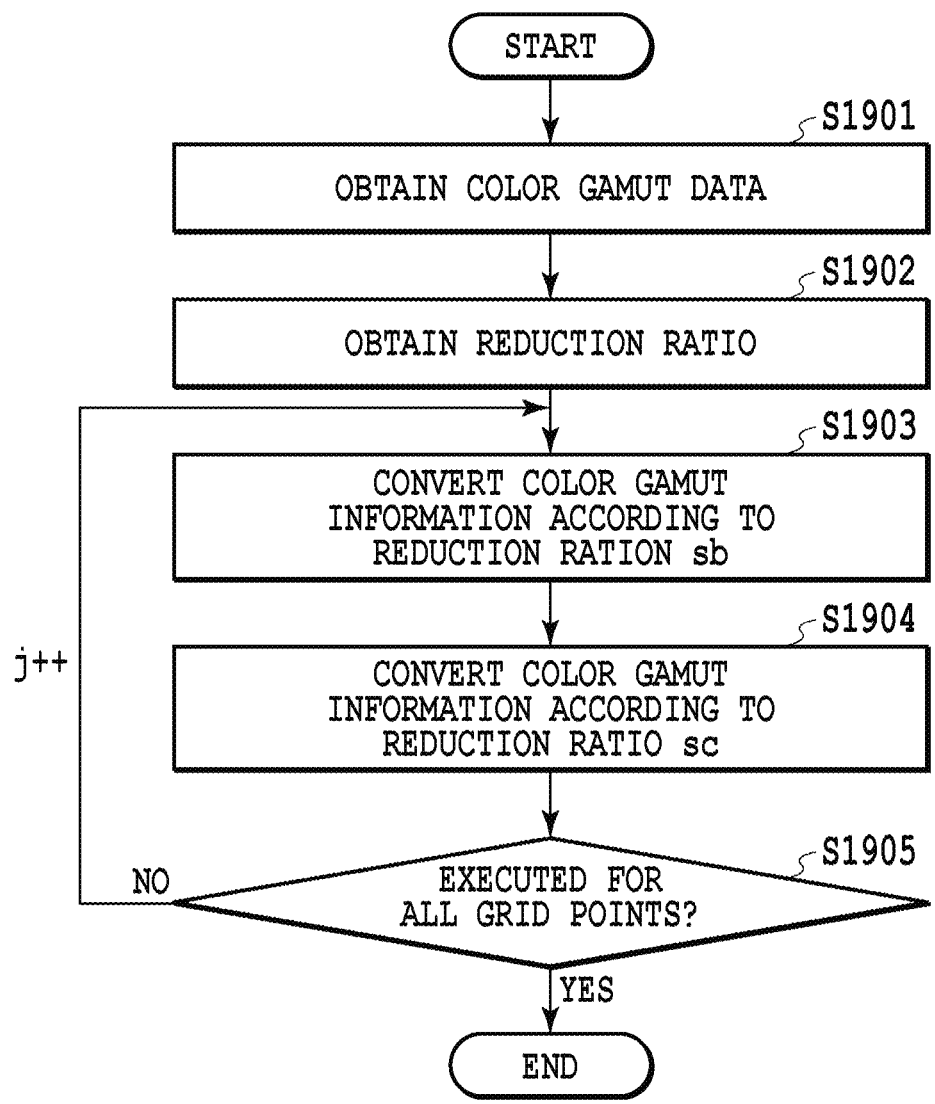
FIG. 19 is a flowchart showing color gamut calculation processing in Example 2.

FIG. 19 is a flowchart of the color gamut derivation processing executed by the color gamut deriving unit 304 in step S404. In step S1901, the color gamut deriving unit 304 obtains the color gamut data. The color gamut data obtained here is data to express the color gamut characteristic in the case of printing on the flat surface using the printer 209 as explained in Example 1. In step S1902, the color gamut deriving unit 304 obtains the reduction ratios. The reduction ratios obtained here are the reduction ratios sb and sc which are obtained in step S1708 and respectively correspond to the regions Gb' and Gc'.

In step S1903, the color gamut deriving unit 304 performs the processing of Formula 10 to convert the color gamut data using the color gamut data obtained in step S1901 and the reduction ratio sb obtained in step S1902. Formula 10 is the processing similar to that of Formula 6 explained in Example 1.

$$L_j' = L_j + s_b \times (L_{cp1} - L_j)$$

$$a_j' = a_j + s_b \times (a_{cp1} - a_j)$$

$$b_j' = b_j + s_b \times (b_{cp1} - b_j) \quad \text{Formula 10}$$

In step S1904, the color gamut deriving unit 304 performs the processing of Formula 11 to convert the color gamut data using the color gamut data converted in step S1903 and the reduction ratio sc obtained in step S1902. Here, the color value calculated in step S1903 is denoted by $L_j'a_j'b_j'$, and the color value at the point CP2 where the chroma and the lightness are zero is denoted by $L_{cp2}a_{cp2}b_{cp2}$, and the color value after the conversion $L_j''a_j''b_j''$ is obtained as in Formula 11.

$$L_j'' = L_j' + s_c \times (L_{cp2} - L_j')$$

$$a_j'' = a_j' + s_c \times (a_{cp2} - a_j')$$

$$b_j'' = b_j' + s_c \times (b_{cp2} - b_j') \quad \text{Formula 11}$$

In step S1905, the color gamut deriving unit 304 determines whether the processing has been executed or not for all pieces of grid point information to perform the operation for termination if the processing has been executed, and otherwise, jumps to step S1903.

According to the present example, the color gamut reduction ratio is derived from the relationship between the frequency and the amplitude included in a phase of an image, the color gamut characteristic data for the case of forming the print layer on a flat surface is multiplied by the color gamut reduction ratio, and thereby the color gamut corresponding to each roughness is calculated. Further, the color gamut reduction ratio can be calculated even in the case of including the characteristic different in color gamut reduction tendency due to the frequency and the amplitude. Thereby, the holding of the color gamut information for each roughness is not necessary and the holding of many profiles is not necessary, and therefore the memory cost is reduced and the profile is efficiently generated.

EXAMPLE 3

In Example 1 and Example 2, for the derivation of the color gamut reduction ratio corresponding to the roughness, the method of deriving the color gamut reduction ratio using a plurality of frequency component coefficients and amplitudes is explained. In the method of Example 1 and Example 2, however, sometimes the processing takes time. In the following, there will be explained a simple color gamut derivation method of deriving the color gamut reduction ratio from the information of a single frequency component. Here, simple explanation will be made mainly for a difference from Example 1 and Example 2.

<Reduction Ratio Derivation Operation>

Figure 20:
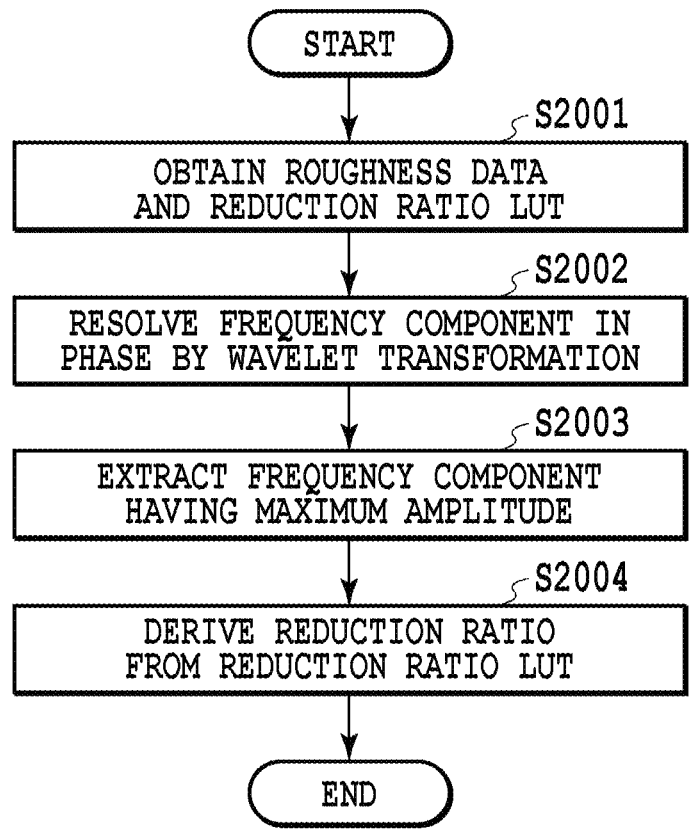
FIG. 20 is a flowchart showing calculation processing of a color gamut reduction ratio in Example 3.

FIG. 20 is a flowchart of processing executed by the roughness analysis unit 303 in step S403 to derive the color gamut reduction ratio of the pixel i.

Steps S2001 and S2002 are the same as steps S1001 and S1002 of FIG. 10.

In step S2003, the roughness analysis unit 303 extracts a frequency component having the maximum power from the frequency components resolved in step S2002. In step S2004, the roughness analysis unit 303 obtains a reduction ratio corresponding to the frequency component having the maximum power which is extracted in step S2003 from the reduction ratio LUT, and performs the operation for termination.

According to the present example, the color gamut reduction ratio is derived from the frequency having the maximum power, the color gamut characteristic data for the case of forming the print layer on a flat surface is multiplied by the color gamut reduction ratio, and thereby the color gamut corresponding to each roughness is derived. Since the color gamut reduction ratio is calculated from only the single frequency component, it is possible to reduce processing time.

OTHER EXAMPLES

Note that the roughness data maybe XYZ coordinates in the three-dimensional space, or simply Z information or normal line information, other than the information corresponding to a height from the base material plane at each pixel position as described above.

Further, while the ratio of the color difference from the neighboring pixel between before and after the color gamut change and the threshold value are compared as a method of obtaining a pixel to be highlighted in the user interface, the color difference may be used. Further, while the conversion level of the discrete wavelet transformation is level 2, the level may be level 3 or a higher level. While the discrete wavelet transformation is preferable for the frequency resolution method, the present invention is not limited thereto. Any method can be applied for separating the high frequency component and the low frequency component. Further, the relationship between the frequency and the reduction ratio may be defined by y or a polynomial expression, not limited to the LUT format.

Further, while the evaluation value is calculated as a value on the LAB color space in each of examples, obviously the evaluation value may be converted into a value in the CIEXYZ space, the CIELUV space, the CIECAM97 or CIECAM02 space or the like, for example. Moreover, while the colorimetrical coincidence is explained as an example, obviously the present invention is not limited thereto if the color conversion is mapping within the color gamut.

Further, in each of examples, the explanation is provided by the use of the measurement system of 45 degree incident and 0 degree light reception as an example of a measurement geometrical condition, obviously a measurement system suitable for an optional observation condition of a user may be used. Moreover, obviously an optional point may be set for the color gamut reduction convergence point cp1 described in FIG. 1C and the color gamut reduction convergence point cp1 or cp2 described in FIG. 15D, according to the optional observation condition of the user.

Further, while, in each of examples, only the information of the maximum power direction based on the frequency resolution result by the wavelet transformation is used in the calculation of the linear sum of the reduction ratios, the power linear sum of all the frequencies in all the directions may be used without the direction determination.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a user can confirm print color easily corresponding to a rough surface having a roughness without increase in memory cost for holding many profiles or increase in work load for profile generation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-057606, filed Mar. 20, 2015, which is hereby incorporated by reference wherein in its entirety.

What is claimed is:

1. A color conversion apparatus outputting image data on an object to be reproduced to a printing unit, comprising:

a roughness data obtaining unit configured to obtain roughness data indicating a roughness of the object;

a reduction ratio deriving unit configured to derive a reduction ratio of a color gamut in each pixel according to a roughness of the pixel in the obtained roughness data;

a color gamut deriving unit configured to derive color gamut data to be applied to each pixel by changing color gamut data for the printing unit according to the derived reduction ratio; and a color conversion unit configured to perform color conversion on each pixel in the image data by using the derived color gamut data.

2. The color conversion apparatus according to claim 1, wherein
the reduction ratio deriving unit derives the reduction ratio of the color gamut in each pixel by using a frequency of a roughness in each pixel in the obtained roughness data.

3. The color conversion apparatus according to claim 2, wherein
the reduction ratio deriving unit derives the reduction ratio of the color gamut in each pixel by referring to a table associating a frequency of a roughness with a reduction ratio.

4. The color conversion apparatus according to claim 3, wherein
the reduction ratio deriving unit derives the reduction ratio of the color gamut in each pixel by obtaining a linear sum of reduction ratios for frequency components in each pixel.

5. The color conversion apparatus according to claim 1, wherein
the reduction ratio deriving unit derives the reduction ratio of the color gamut in each pixel by using a frequency and an amplitude of a roughness in each pixel in the obtained roughness data.

6. The color conversion apparatus according to claim 5, wherein
the reduction ratio deriving unit derives the reduction ratio of the color gamut in each pixel by referring to a table associating a frequency and an amplitude of a roughness and a reduction ratio with each other.

7. The color conversion apparatus according to claim 6, wherein
the reduction ratio deriving unit derives the reduction ratio of the color gamut in each pixel by obtaining a linear sum of reduction ratios for frequency components in each pixel, for each frequency component having a different reduction property.

8. The color conversion apparatus according to claim 7, wherein
the color gamut deriving unit modifies the color gamut data for the printing unit on a substantially flat surface based on a reduction ratio for a frequency component corresponding to color gamut reduction in a low lightness portion, and further modifies the modified color gamut data based on a reduction ratio for a frequency component corresponding to decrease in lightness as a whole caused by decrease in light amount, to derive the color gamut data in each pixel.

9. The color conversion apparatus according to claim 1, wherein
the reduction ratio deriving unit derives the reduction ratio of the color gamut in each pixel by using a frequency component in a direction to exhibit a maximum amplitude.

10. The color conversion apparatus according claim 1, wherein
the roughness data obtaining unit obtains height information indicating a height of each pixel in an image expressed by the image data as roughness data of the pixel.

11. The color conversion apparatus according to claim 1, further comprising a display unit configured to display color-converted image data, wherein
the display unit displays an image obtained by highlighting a pixel in which a ratio of a color difference from a neighboring pixel between before and after color gamut change is larger than a predetermined threshold value among pixels in the image data.

12. The color conversion apparatus according to claim 11, still further comprising
a first reception unit configured to receive change of the threshold value from a user, wherein
the display unit, in a case where the threshold value is changed, displays the highlighted image according to a result of comparison with a threshold value after the change.

13. The color conversion apparatus according to claim 11, still further comprising
a second reception unit configured to receive, from a user, setting of a first mode of using a maximum color gamut or a second mode of using a minimum color gamut in color gamut data of each pixel derived by the color gamut deriving unit, wherein
the color conversion unit,
in a case of receiving the first mode setting, performs color conversion for each pixel in the image data by using the color gamut data in each pixel derived by the color gamut deriving unit, and,
in a case of receiving the second mode setting, performs color conversion for each pixel in the image data by using color gamut data indicating a common color gamut in the color gamut data in each pixel derived by the color gamut deriving unit.

14. A color conversion method in a color conversion apparatus outputting image data on an object to be reproduced to a printing unit, comprising the steps of:
obtaining roughness data indicating a roughness of the object;
deriving a reduction ratio of a color gamut in each pixel according to a roughness of the pixel in the obtained roughness data;
deriving color gamut data in each pixel by changing color gamut data for the printing unit on a substantially flat surface according to the derived reduction ratio; and
performing color conversion on each pixel in the image data by using the derived color gamut data.

15. A non-transitory computer readable storage medium storing a program which causes a computer to perform a color conversion method in a color conversion apparatus outputting image data on an object to be reproduced to a printing unit, the method comprising the steps of:
obtaining roughness data indicating a roughness of the object;
deriving a reduction ratio of a color gamut in each pixel according to a roughness of the pixel in the obtained roughness data;
deriving color gamut data in each pixel by changing color gamut for the printing unit on a substantially flat surface according to the derived reduction ratio; and
performing color conversion on each pixel in the image data by using the derived color gamut data.

16. A color conversion apparatus outputting image data representing an image on an object to be reproduced to a printer, comprising:
a roughness data obtaining unit configured to obtain roughness data indicating roughness of the object and including first roughness data and second roughness data, wherein a roughness indicated by the first roughness data is greater than a roughness indicated by the second roughness data;
a color gamut deriving unit configured to derive color gamut data to be applied to each pixel based on a roughness of the pixel in the obtained roughness data so that a color gamut represented by the color gamut data corresponding to the first roughness data is smaller than a color gamut represented by the color gamut data corresponding to the second roughness data; and
a color conversion unit configured to perform color conversion on each pixel in the image data by using the derived color gamut data.

17. A color conversion method in a color conversion apparatus outputting image data representing an image on an object to be reproduced to a printer, comprising the steps of:
obtaining roughness data indicating a roughness of the object and including first roughness data and second roughness data, wherein a roughness indicated by the first roughness data is greater than a roughness indicated by the second roughness data;
deriving color gamut data to be applied to each pixel based on a roughness of the pixel in the obtained roughness data so that a color gamut represented by the color gamut data corresponding to the first roughness data is smaller than a color gamut represented by the color gamut data corresponding to the second roughness data; and
performing color conversion on each pixel in the image data by using the derived color gamut data.

18. A non-transitory computer readable storage medium storing a program which causes a computer to perform a color conversion method in a color conversion apparatus outputting image data on an object to be reproduced to a printing unit, the method comprising the steps of:
obtaining roughness data indicating a roughness of the object and including first roughness data and second roughness data, wherein a roughness indicated by the first roughness data is greater than a roughness indicated by the second roughness data;
deriving color gamut data to be applied to each pixel based on a roughness of the pixel in the obtained roughness data so that a color gamut represented by the color gamut data corresponding to the first roughness data is smaller than a color gamut represented by the color gamut data corresponding to the second roughness data; and
performing color conversion on each pixel in the image data by using the derived color gamut data.

* * * * *